United States Patent
Tadaki et al.

(10) Patent No.: US 6,191,234 B1
(45) Date of Patent: Feb. 20, 2001

(54) CONJUGATED DIOLEFIN-BASED COPOLYMER RUBBER AND COMPOSITION THEREOF

(75) Inventors: Toshihiro Tadaki; Tamotsu Nagaoka; Hiroshi Akema; Iwakazu Hattori, all of Tokyo (JP)

(73) Assignee: JSR Corporation, Tokyo (JP)

( * ) Notice: Under 35 U.S.C. 154(b), the term of this patent shall be extended for 0 days.

(21) Appl. No.: 09/210,793

(22) Filed: Dec. 15, 1998

(30) Foreign Application Priority Data

Dec. 16, 1997 (JP) .................................... 9-346848
Dec. 16, 1997 (JP) .................................... 9-346886

(51) Int. Cl.$^7$ ..................................... C08F 8/32
(52) U.S. Cl. .................. 525/332.9; 525/332.8; 525/333.1; 525/366; 525/367
(58) Field of Search ............... 525/332.8, 332.9, 525/333.1, 366, 367

(56) References Cited

U.S. PATENT DOCUMENTS

| 4,914,147 | | 4/1990 | Mouri et al. . |
|---|---|---|---|
| 5,463,003 | * | 10/1995 | Horikawa et al. .................. 526/176 |
| 5,798,419 | * | 8/1998 | Ruiz Santa Quiteria et al. ........ 525/332.9 |

FOREIGN PATENT DOCUMENTS

| 0 087 965 | * | 9/1983 | (EP) . |
|---|---|---|---|
| 0 171 877 | * | 2/1986 | (EP) . |
| 0 609 010 | | 8/1994 | (EP) . |
| 0 754 710 | | 1/1997 | (EP) . |
| 0 798 339 | | 10/1997 | (EP) . |
| 49-36957 | * | 10/1974 | (JP) . |
| 52-5071 | * | 2/1977 | (JP) . |
| 57-55912 | * | 4/1982 | (JP) . |
| 58-162604 | * | 9/1983 | (JP) . |
| 58-189293 | * | 11/1983 | (JP) . |
| 59-38209 | * | 3/1984 | (JP) . |
| 61-43402 | * | 3/1986 | (JP) . |
| 61-141741 | * | 6/1986 | (JP) . |
| 61-271338 | * | 12/1986 | (JP) . |
| 64-22940 | * | 1/1989 | (JP) . |
| 1-101344 | * | 4/1989 | (JP) . |
| 1-188501 | * | 7/1989 | (JP) . |
| 5-1298 | * | 1/1993 | (JP) . |
| 5-230286 | * | 9/1993 | (JP) . |
| 6-199923 | * | 7/1994 | (JP) . |
| 6-279515 | * | 10/1994 | (JP) . |
| 7-53616 | * | 2/1995 | (JP) . |
| 9-71687 | * | 3/1997 | (JP) . |

* cited by examiner

Primary Examiner—Bernard Lipman
(74) Attorney, Agent, or Firm—Oblon, Spivak, McClelland, Maier & Neustadt, P.C.

(57) ABSTRACT

Conjugated diolefin-based copolymer rubber of a conjugated diolefin and an aromatic vinyl compound, wherein (1) the content of amino groups bound to the rubber (nitrogen content value) is 0.0025 to 0.20 mmol/g of copolymer rubber, (2) the content of the polymerization units of the aromatic vinyl compound is 5 wt % or more and less than 30 wt % based on the copolymer rubber, and the content of vinyl bonds in the polymerization unit of the conjugated diolefin (the total content of a 1,2-bond and a 3,4-bond) is 55 mol % or more based on the polymerization unit of the conjugated diolefin, or the content of the polymerization units of the aromatic vinyl compound is 30 to 50 wt % based on the copolymer rubber and the content of vinyl bonds in the polymerization unit of the conjugated diolefin is 25 to 55 mol % on the polymerization unit of the conjugated diolefin and (3) the molecular weight distribution is polymodal.

8 Claims, No Drawings

CONJUGATED DIOLEFIN-BASED COPOLYMER RUBBER AND COMPOSITION THEREOF

TECHNICAL FIELD

The present invention relates to conjugated diolefin copolymer rubber. More specifically, it relates to conjugated olefin-based copolymer rubber which can provide an auto tire tread having excellent processability and good balance among abrasion resistance, failure characteristics, hysteresis-loss characteristics and wet-skid resistance.

BACKGROUND ART

Due to recent demand for a reduction in the fuel consumption of an automobile, conjugated diolefin-based rubber having low rolling resistance, excellent abrasion resistance and failure characteristics, and steering stability typified by wet skid resistance has been desired as a rubber material for tires.

To reduce the rolling resistance of a tire, the hysteresis-loss of vulcanized rubber may be lowered. As indices for the evaluation of vulcanized rubber are used impact resilience at 50 to 80° C., tanδ at 50 to 80° C., Goodrich heat build-up and the like. A rubber material having either a large impact resilience at 50 to 80° C. or small tanδ at 50 to 80° C. or small Goodrich heat build-up is preferred.

Known rubber materials having a low hysteresis-loss include natural rubber, polyisoprene rubber and polybutadiene rubber. However, they have small wet skid resistance.

As a means of reducing a hysteresis-loss without sacrificing wet skid resistance, there is proposed a method for introducing a functional group to the terminal end of a styrene-butadiene copolymer which is polymerized by an organic lithium initiator in a hydrocarbon solvent and has a variety of structure. There are known a styrene-butadiene copolymer obtained by modifying or coupling the terminal end of a polymer with a tin compound (see JP-A 57-55912) and a styrene-butadiene copolymer obtained by modifying the terminal of a polymer with an isocyanate compound (see JP-A 61-141741). These modified polymers show the effect of reducing a hysteresis-loss and improving abrasion resistance and failure characteristics without sacrificing wet skid resistance, particularly in a compound comprising carbon black as a reinforcement.

Meanwhile, there has recently been proposed a method which uses a rubber compound, comprising silica or a mixture of silica and carbon black as a reinforcement, as a rubber material for tires. A tire tread made from such a rubber composition containing silica or a mixture of silica and carbon black has low rolling resistance and excellent steering stability typified by wet skid resistance, while the vulcanizate of the rubber compound has such problems as low tensile strength and low abrasion resistance. Compounds comprising the above modified styrene-butadiene copolymers and carbon black as a reinforcement may be used as rubber materials for tires having excellent abrasion resistance and failure characteristics, whereas compounds comprising the above modified styrene-butadiene copolymers and silica as a reinforcement have a small effect of improving these properties.

To improve the tensile strength and abrasion resistance of the vulcanizate containing silica or a mixture of silica and carbon black, there is proposed a rubber composition comprising a polymer into which a functional group having affinity for silica has been introduced. JP-B 49-36957 proposes a method for producing a polymer by reacting silicon tetrahalide, trihalosilane or the like. JP-B 52-5071 discloses a method for producing a polymer modified with silane halide compound. Further, JP-A 1-188501 discloses diene-based rubber into which an alkylsilyl group has been introduced and JP-A 5-230286 discloses diene-based rubber into which a silyl halide group has been introduced.

Although the physical properties of a silica or a mixture of silica and carbon black-filled vulcanizate are improved to a certain degree by using these modified polymers, improvements in the tensile strength and abrasion resistance of the vulcanizate thereof are still unsatisfactory. A reduction in hysteresis-loss is also unsatisfactory due to an increase in the proportion of carbon black when a mixture of silica and carbon black is blended. As a silica-containing compound is generally inferior in processability to a carbon black-containing compound, its process costs are high. When a polymer into which a functional group having affinity for silica is introduced is used, its processability is apt to deteriorate disadvantageously.

Conventionally known modified polymers are divided into a type suitable to carbon black-filled compound and a type suitable to silica-filled compound. When a tire is to be produced, rubber to be used must be selected when the type of a reinforcement is changed. When a mixture of silica and carbon black is blended, the effect of either one of the types of the modified polymers increases or reduces relative to the mixing ratio of silica to carbon black.

A polymer to which an amino group is introduced is conceivable as a modified polymer which is effective in blending carbon black or silica. As polymers containing carbon black, there are proposed (1) polymers having an amino group introduced to the terminal using a lithium amide initiator (see JP-A 59-38209, JP-B 5-1298, JP-A 6-279515, JP-A 6-199923 and JP-A 7-53616) and (2) polymers obtained by modifying the terminal of a styrene-butadiene copolymer which is polymerized by an organic lithium initiator and has a variety of structure with an urea compound (see JP A 61-277338) or with a nitrogen-containing compound such as a dialkyl aminobenzophenone compound (see JP-A 58-162604 and JP-A 58-189203) or a lactam compound (see JP-A 61-43402). As a polymer to be blended with silica is proposed diene-based rubber having an introduced amino group as disclosed by JP-A 1-101344, JP-A 64-22940 and JP-A 9-71687.

The polymers obtained by these methods have improved their physical properties to a certain degree by containing carbon black or silica. However, in the above documents, a method for introducing an amino group into a polymer is detailed but as for the relationship between the structure and each property of the polymer itself, only a general description is given.

Problems that the Invention intends to solve

It is an object of the present invention to provide conjugated diolefin copolymer rubber having novel composition and characteristics.

It is another object of the present invention to provide conjugated diolefin-based copolymer rubber having an amino group in the polymer chain, a specific content of polymerization units of an aromatic vinyl compound, a specific content of vinyl bonds in the polymerization unit of a specific conjugated diolefin, and a specific GPC molecular weight distribution.

It is also another object of the present invention to provide conjugated diolefin-based copolymer rubber which has excellent processability when containing carbon black or silica, improves both hysteresis-loss characteristics and wet skid resistance at the same time without sacrificing abrasion resistance and failure characteristics or improves hysteresis-loss characteristics, abrasion resistance and failure characteristics in a well balanced manner at the same time without sacrificing wet skid resistance; and which can be used as a tread material for low fuel consumption tires, large-sized tires and high-performance tires.

Other objects and advantages of the present invention will become apparent from the following description.

According to the present invention, the above objects and advantages of the present invention are attained by copolymer rubber of a conjugated diolefin and an aromatic vinyl compound (may be referred to as "the first copolymer rubber of the present invention" hereinafter), wherein (1) the content of amino groups bound to the copolymer rubber (nitrogen content value) is 0.0025 to 0.20 mmol/g of copolymer rubber, (2) the content of the polymerization units of the aromatic vinyl compound is 5 wt % or more and less than 30 wt % based on the copolymer rubber, (3) the content of vinyl bonds in the polymerization unit of the conjugated diolefin (the total content of a 1,2-bond and a 3,4-bond) is 55 mol % or more based on the polymerization unit of the conjugated diolefin, and (4) the molecular weight distribution is polymodal, or by copolymer rubber of a conjugated diolefin and an aromatic vinyl compound (may be referred to as "the second copolymer rubber of the present invention" hereinafter), wherein (1) the content of amino groups bound to the rubber (nitrogen content value) is 0.0025 to 0.20 mmol/g of copolymer rubber, (2) the content of the polymerization units of the aromatic vinyl compound is 30 to 50 wt % based on the copolymer rubber, (3) the content of vinyl bonds in the polymerization unit of the conjugated diolefin (the total content of a 1,2-bond and a 3,4-bond) is 25 to 55 mol % based on the polymerization unit of the conjugated diolefin, and (4) the molecular weight distribution is polymodal.

The present invention will be described in detail hereinafter.

The copolymer rubber of the present invention (including both the first copolymer rubber and the second copolymer rubber, the same shall apply hereinafter unless otherwise stated) is a polymer obtained by copolymerizing a conjugated diolefin and an aromatic vinyl compound and characterized by having amino groups.

The content of the amino groups bound to the copolymer rubber is 0.0025 to 0.20 mmol/g of copolymer rubber. The content is preferably 0.0030 to 0.10 mmol/g of copolymer rubber, more preferably 0.0030 to 0.05 mmol/g of copolymer rubber.

The amino group may be bound to the polymerization start terminal or end terminal, or the main chain or side chain of a polymer. It is preferably introduced to the polymerization start terminal or end terminal so that hysteresis-loss characteristics can be improved by suppressing an energy loss from the terminal of a polymer.

When the number of amino groups bound to the polymer chain is more than 0.20 mmol/g of copolymer rubber, interaction between the amino groups and a reinforcement such as carbon black or silica becomes too high and compounding viscosity increases, thereby reducing processability. When the number of amino groups is less than 0.0025 mmol/g of copolymer rubber, an effect obtained by introducing amino groups is not exhibited.

The amino groups introduced to the chain of the polymer of the present invention are represented by the following formulas (a1) and (a2).

(a1)

(wherein $R^1$ is hydrogen (—H), alkyl group having 1 to 20 carbon atoms or aryl group having 6 to 20 carbon atoms, and $R^2$ is an alkyl group having 1 to 20 carbon atoms or aryl group having 6 to 20 carbon atoms.)

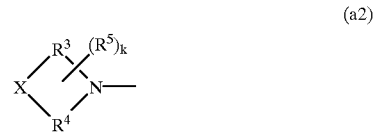
(a2)

(wherein $R^3$ and $R^4$ are the same or different and each an alkylene group having 1 to 3 carbon atoms, X is a group selected from —CH$_2$—, —O— and —NH—, $R^5$ is hydrogen (—H) or alkyl group having 1 to 5 carbon atoms, and k is an integer of 1 to 4.)

Illustrative examples of the structures represented by the above formulas (a1) and (a2) include dimethylamino group, diethylamino group, dipropylamino group, di-n-butylamino group, diisobutylamino group, dipentylamino group, dihexylamino group, di-n-butylamino group, diheptylamino group, dioctylamino group, diallylamino group, dicyclohexylamino group, butylisopropylamino group, dibenzylamino group, methylbenzylamino group, dibenzylamino group, methylhexylamino group, ethylhexylamino group, trimethyleneimino group, tetramethyleneimino group, 2-methyltetramethyleneimino group, 3-methyltetramethyleneimino group, pentamethyleneimono group, 2-methylpentamethyleneimino group, 3-methylpentamethyleneimino group, 4-methylpentamethyleneimino group, 3,5-dimethylpentamethyleneimino group, 2-ethylpentamethyleneimino group, hexamethyleneimono group, heptamethyleneimono group, dodecamethyleneimino group and the like.

When the introduction rate of these functional groups is less than 0.0025 mmol/g of a polymer, the hysteresis-loss characteristics, abrasion resistance and failure characteristics of the obtained copolymer rubber are not sufficiently improved, disadvantageously.

The method of introducing the functional group(s) of the formula (a1) and/or the formula (a2) into the terminal of the polymer of the present invention is not particularly limited, but the following methods can be employed, for example.

1. Method (1), which comprises reacting an organic monolithium compound with a vinyl compound having the functional group(s) of the formula (a1) and/or the formula (a2) or with a conjugated diolefin compound and copolymerizing a conjugated diolefin with an aromatic vinyl compound.

Illustrative examples of the vinyl compound having the functional group(s) of the formula (a1) and/or the formula (a2) used in the method (1) include p-dimethylaminostyrene, p-diethylaminostyrene, p-dimethylaminomethylstyrene, p-(2-dimethylaminoethyl)styrene, m-(2-dimethylaminoethyl)styrene, p-(2-diethylaminoethyl)

styrene, p-(2-dimethylaminovinyl)styrene, p-(2-diethylaminovinyl)styrene, 2-vinylpyridine, 4-vinylpyridine, 2-vinyl-5-ethylpyridine, 4-vinylbenzyldimethylaminoethylether and the like.

2. Method (2), which comprises copolymerizing a conjugated diolefin with an aromatic vinyl compound in the presence of either the reaction product of the secondary amine compound(s) of the formula (a1) and/or the formula (a2) and an organic metal compound, or an alkali metal amide compound(s) of the formula (a1) and/or the formula (a2) as a polymerization initiator.

Illustrative examples of the secondary amine compound of the formula (a1) used in the method (2) include dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine and the like. Illustrative examples of the secondary amine compound of the formula (a2) include morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-azabicyclo[3.2.2]nonane, carbazole and the like.

The alkali metal amide compound(s) of the formula (a1) and/or the formula (a2) are a compound(s) obtained by substituting the hydrogen atom (H) of the secondary amine compounds of the formula (a1) and/or the formula (a2) with an alkali metal (Li, Na, K, Rb or Sc).

3. Method (3), which comprises copolymerizing a conjugated diolefin with an aromatic vinyl compound in the presence of either the reaction product of the tertiary amine compound(s) of the formula (a1) and/or the formula (a2) and an organic alkali metal compound, or the alkali metal compound(s) of the formula (a1) and/or the formula (a2) as a polymerization initiator.

Illustrative examples of the tertiary amine compound of the formula (a1) used in the method (3) include N,N-dimethyl-o-toluidine, N,N-dimethyl-p-toluidine, N,N-dimethyl-m-toluidine, α-picoline, β-picoline, γ-picoline, benzyldimethylamine, benzyldiethylamine, benzyldipropylamine, benzyldibutylamine, (o-methylbenzyl)dimethylamine, (m-methylbenzyl)dimethylamine, (p-methylbenzyl)dimethylamine and the like.

Illustrative examples of the tertiary amine compound of the formula (a2) include N,N-tetramethylene-o-toluidine, N,N-heptamethylene-o-toluidine, N,N-hexamethylene-o-toluidine, N,N-trimethylenebenzylamine, N,N-tetramethylenebenzylamine, N,N-hexamethylenebenzylamine, N,N-tetramethylene(o-methylbenzyl)amine, N,N-tetramethylene(p-methylbenzyl)amine, N,N-hexamethylene(o-methylbenzyl)amine, N,N-hexamethylene(o-methylbenzyl)amine and the like.

The organic metal compound(s) of the formula (a1) and/or the formula (a2) are a compound(s) obtained by substituting the active hydrogen atoms of the tertiary amine compounds of the formula (a1) and/or the formula (a2) with an alkali metal (Li, Na, K, Rb or Sc).

When the conjugated diolefin is copolymerized with the aromatic vinyl compound in the presence of, as a polymerization initiator, the reaction product of the secondary amine compound(s) or tertiary amine compound(s) of the formula (a1) and/or the formula (a2) and an organic alkali metal compound, the organic alkali metal compound to be reacted with the above secondary amine compound or tertiary amine compound is preferably an organic lithium compound. Specific examples of the organic lithium compound include ethyl lithium, propyl lithium, n-butyl lithium, sec-butyl lithium, tert-butyl lithium, hexyl lithium, and mixtures thereof. Of these, n-butyl lithium and sec-butyl lithium are preferred.

The molar ratio of the amino group (NH) in the structure of the secondary amine compound or the active hydrogen in the structure of the tertiary amine compound to the organic alkali metal compound must be 1:0.2 to 5.0, preferably 1:0.5 to 2.0, more preferably 1:0.8 to 1.2, to carry out the reaction between the secondary amine compound or the tertiary amine compound and the organic alkali metal compound. When the molar ratio of the organic alkali metal compound to the amino group (NH) in the structure of the secondary amine compound or to the active hydrogen in the structure of the tertiary amine compound is larger than 5.0, the effect of improving tensile strength, abrasion resistance and hysteresis-loss characteristics is not obtained. On the other hand, when the above molar ratio is smaller than 0.2, the polymerization rate remarkably lowers, thereby not only reducing productivity sharply but also lowering modification efficiency at the time of modifying the terminal of a polymer with a functional group.

The reaction between the secondary amine compound or the tertiary amine compound and the organic alkali metal compound may be carried out in a reaction pot separate from a polymerization vessel before polymerization, and the reaction product may be charged into the polymerization vessel.

The reaction between the secondary amine compound or the tertiary amine compound and the organic alkali metal compound basically proceeds instantaneously but an aging time of 1 to 180 minutes may be taken. Since the product of the reaction is relatively stable in a nitrogen atmosphere, it may be used immediately after the reaction or may be used after stored for 10 to 14 days. The reaction between the secondary amine compound or the tertiary amine compound and the organic alkali metal compound is desirably carried out a temperature range of 0 to 120° C.

Polymerization may be carried out after the reaction between the secondary amine compound or the tertiary amine compound and the organic alkali metal compound is carried out in a polymerization vessel in the presence of both a monomer of a conjugated diolefin and a monomer of an aromatic vinyl compound. The reaction temperature at this point corresponds to the polymerization start temperature but may be arbitrarily selected from a temperature range of 0 to 120° C.

The copolymer rubber of the present invention is a polymer obtained by copolymerizing a conjugated diolefin with an aromatic vinyl compound and characterized by having amino groups as described above.

Preferred examples of the conjugated diolefin compound used in the present invention include 1,3-butadiene, isoprene, 2,3-dimethyl-1,2-butadiene, 2-chloro-1,3-butadiene, 1,3-pentadiene, and mixtures thereof.

Preferred examples of the aromatic vinyl compound include styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, and mixtures thereof. Of these, styrene is particularly preferred.

The content of the aromatic vinyl compound bound to the polymer chain, that is, the content of the polymerization units of the aromatic vinyl compound is 5 wt % or more and less than 30 wt %, preferably 10 wt % or more and less than 27 wt %, based on the first copolymer rubber of the present invention. When the content of the bound aromatic vinyl compound is less than 5 wt %, wet skid resistance, abrasion resistance and failure characteristics deteriorate. On the other hand, when the content is 30 wt % or more, the balance between hysteresis-loss characteristics and wet skid resistance is worsen.

The content of the 1,2-bond and 3,4-bond (to be referred to as "vinyl bonds" hereinafter) in the polymerization unit of the conjugated diolefin is 55 mol % or more, preferably 57 mol % or more, more preferably 59 mol % or more, based on the polymerization unit of the conjugated diolefin. When the content of the vinyl bonds is less than 55 mol %, the balance between hysteresis-loss characteristics and wet skid resistance is worsen. It is difficult to increase the content of the vinyl bonds to 90 mol % or more by a commonly used method for synthesizing a copolymer of an aromatic vinyl compound and a conjugated diolefin.

In the second copolymer rubber of the present invention, the content of the aromatic vinyl compound bound to the polymer chain is 30 to 50 wt %, preferably 30 to 45 wt %, based on the copolymer rubber. When the content of the bound aromatic vinyl compound is less than 30 wt %, wet skid resistance, abrasion resistance and failure characteristics deteriorate. On the other hand, when the content is more than 50 wt %, a hysteresis-loss increases.

Further, the content of the 1,2-bond and 3,4-bond in the polymerization unit of the conjugated diolefin is 25 to 55 mol %, preferably 28 to 55 mol %, more preferably 30 to 45 wt %, based on the polymerization unit of the conjugated diolefin. When the content of the vinyl bonds is less than 25 mol %, wet skid resistance and steering stability deteriorate. On the other hand, when the content is more than 55 mol %, tensile strength and abrasion resistance degrade and a hysteresis-loss increases.

The copolymer rubber of the present invention is characterized in that its molecular weight distribution measured by GPC is polymodal.

When the molecular weight distribution is monomodal and narrow (for example, Mw/Mn is less than 2.0) and the copolymer rubber is compounded with a reinforcement or other compounding ingredients, viscosity increases and processability deteriorates. Deterioration in the processability of a compound increases working costs, causes a dispersion failure of a reinforcement and other compounding ingredients and reduces the physical properties of the compound. When the molecular weight of raw rubber is reduced to lower the viscosity of the compound, hysteresis-loss characteristics deteriorate, the viscosity of rubber increases with the result that handling properties degrade, and a cold flow grows with the result that storage stability lowers.

When the molecular weight distribution is monomodal and wide (for example, Mw/Mn is 2.0 or more), a low-molecular weight component increases, whereby hysteresis-loss characteristics and abrasion resistance deteriorate.

The method for making polymodal the molecular weight distribution measured by GPC of the copolymer rubber of the present invention is not particularly limited, but there are the following methods, for example.

1. Method (1), which comprises copolymerizing a conjugated diolefin with an aromatic vinyl compound and adding a specific coupling agent when the polymerization conversion reaches 90 to 100% to react the coupling agent with part of the active terminals of a polymer to jump the molecular weight. The amount of the coupling agent added is adjusted to control the amount of a polymer having an increased molecular weight and the amount of a polymer not reacted with the coupling agent so as to make the molecular weight distribution polymodal.

2. Method (2), which comprises adding a reagent (so called short-stop) for deactivating part of the active terminals of a polymer when the polymerization conversion is 50% or less during the copolymerization of a conjugated diolefin with an aromatic vinyl compound. Since the non-deactivated terminals of the polymer polymerize the residual monomer, the molecular weight of the polymer becomes larger than that of the deactivated polymer, whereby the molecular weight distribution becomes polymodal.

Of these, the method (1) in which a coupling agent is added is preferred from the viewpoint of the physical properties and productivity of the polymer.

The specific coupling agent that is caused to be reacted with the active terminals of the polymer when the polymerization conversion reaches 90 to 100% is at least one compound selected from the group consisting of (a) an isocyanate compound and/or an isothiocyanate compound, (b) an amide compound and/or an imide compound, (c) a pyridyl-substituted ketone compound and/or a pyridyl-substituted vinyl compound, (d) a silicon compound, (e) an ester compound, (f) a ketone compound and (g) a tin compound.

Of these compounds, specific examples of the isocyanate compound and thioisocyanate compound as the component (a) preferably include 2,4-tolylene diisocyanate, 2,6-tolylene diisocyanate, diphenylmethane diisocyanate, polymeric-type diphenylmethane diisocyanate (C-MDI), isophorone diisocyanate, hexamethylene diisocyanate, 1,3, 5-benzene thioisocyanate, phenyl-1,4-diisothiocyanate and the like.

Specific examples of the amide compound and imide compound as the component (b) preferably include amide compounds such as succinamide, phthalamide, N,N,N',N'-tetramethyl phthalamide, oxamide and N,N,N',N'-tetramethyl oxamide; and imide compounds such as succinimide, N-methyl succinimide, maleimide, N-methyl maleimide, phthalimide and N-methyl phthalimide.

Specific examples of the pyridyl-substituted ketone compound and pyridyl-substituted vinyl compound as the component (c) preferably include dibenzoylpyridine, diacetylpyridine, divinylpyridine and the like.

The components (a) to (c) each may be added in such amounts that ensure that the amounts of functional groups such as an isocyanate group, isothiocyanate group, carbonyl group and vinyl group should be generally 0.2 to 10 equivalents, preferably 0.5 to 5.0 equivalents, based on the equivalent of 1 g of lithium atoms. When the amount is smaller than 0.2 equivalent, the impact resilience and heat-build-up reducing effect of the vulcanized rubber deteriorate. On the other hand, when the amount is larger than 10 equivalents, the amount of an unreacted product increases, thereby giving off an odor, increasing vulcanizing speed and reducing the impact resilience and heat-build-up reducing effect of the vulcanized rubber, disadvantageously.

Specific examples of the silicon compound as the component (d) preferably include dibutyl dichlorosilicon, methyl trichlorosilicon, methyl dichlorosilicon, tetrachlorosilicon, triethoxymethylsilane, triphenoxymethylsilane, trimethoxysilane, methyltriethoxysilane, 4,5-epoxyheptylmethyldimethoxysilane, bis (triethoxysilylpropyl)tetrasulfide and the like. The component (d) may be added in such amount that ensures that the total amount of a halogen atom, phenoxy group and ester group is to be 0.05 to 5 equivalents, preferably 0.1 to 1.5 equivalents, based on the equivalent of 1 g of lithium atoms.

Specific examples of the ester compound as the component (e) preferably include diethyl adipate, diethyl malonate, diethyl phthalate, diethyl glutarate, diethyl maleate and the like. The component (e) may be added in such an amount that ensures that the amount of an ester group is to be 0.05 to 1.5 equivalents based on the equivalent of 1 g of lithium atoms.

Specific examples of the ketone compound as the component (f) preferably include N,N,N',N'-tetramethyl-4,4-diaminobenzophenone, N,N,N',N'-tetraethyl(4,4-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone and the like. The component (f) may be added in such an amount to ensure that the amount of a carbonyl group is to be 0.05 to 5 equivalents based on the equivalent of 1 g of lithium atoms.

Specific examples of the tin compound as the component (g) preferably include tetrachlorotin, tetrabromotin, trichlorobutyltin, trichloromethyltin,, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannylethane), 1,4-bis(trichlorostannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate and the like.

The component (g) may be added in such an amount that ensures that the amount of a halogen atom or carboxylate group is be 0.05 to 5 equivalents based on the equivalent of 1 g of lithium atoms.

These compounds that are added and reacted when the polymerization conversion of the copolymer rubber reaches 90 to 100% may be used alone or in combination of two or more.

To enhance the reaction efficiency of the compounds with the active terminals of the polymer, it is preferred that a terminal modification reaction is carried out after a conjugated diene compound such as 1,3-butadiene is added to a polymerization system after the production of copolymer rubber in an amount of 0.5 to 500 moles, preferably 1 to 200 moles, based on the equivalent of 1 g of lithium atoms.

Of the above compounds, when at least one compound selected from (a) an isocyanate compound and/or an isothiocyanate compound, (d) a silicon compound, (f) a ketone compound and (g) a tin compound is used, a polymer suitable for use in low fuel consumption tires and large-sized tires which are required to have improved abrasion resistance and hysteresis-loss characteristics and in high-performance tires which are required to have steering stability, typified by wet skid resistance, and high tensile strength.

Extender oil or liquid rubber can be added to a polymer that is modified or coupled with these compounds. when highly aromatic extender oil having a viscosity-gravity constant of at least 0.950 is used in conjunction with a tin compound (g), the tin-carbon bond is cleaved before compounding and the modification effect is lost. Therefore, extender oil having a viscosity-gravity constant of 0.800 to 0.950 or liquid rubber is preferred.

When the tin compound (g) is used out of the above compounds, it exhibits an excellent effect of improving processability, which is the object of the present invention. This is particularly preferred.

In the present invention, a polymer having the modified or coupled terminal of the polymer chain is preferably contained in an amount of 40 wt % or more based on the total amount of all polymers. When the amount is smaller than 40 wt %, it is not preferred from the viewpoint of tensile strength and hysteresis-loss characteristics.

The polymerization reaction and modification or coupling reaction for obtaining the copolymer rubber of the present invention are generally carried out at a temperature of 0 to 120° C., under either a constant temperature condition or a temperature-rising condition. The polymerization system may be either batch or continuous.

An ether compound such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene or dimethoxyethane, and/or a tertiary amine compound such as triethylamine, pyridine, N,N,N',N'-tetramethylethylene diamine, dipiperidinoethane, methyl ether of N,N-diethylethanolamine, ethyl ether of N,N-diethylethanolamine, or butyl ether of N,N-diethylethanolamine are/is added to a polymerization system as required to adjust the microstructure (content of vinyl bonds) of the conjugated diolefin portion of the diolefin-based (co)polymer.

Preferred examples of the hydrocarbon solvent used to polymerize the copolymer rubber of the present invention include pentane, hexane, heptane, octane, methylcyclopentane, cyclohexane, benzene, xylene and the like.

To improve the reactivity of an initiator used in the present invention, to arrange the aromatic vinyl compound to be introduced to the polymer at random or to provide the single chain of the aromatic vinyl compound, a potassium compound may be added together with the polymerization initiator. Illustrative examples of the potassium compound to be added together with the polymerization initiator include potassium alkoxides and potassium phenoxides such as potassium isopropoxide, potassium-t-butoxide, potassium-t-amyloxide, potassium-n-heptaoxide, potassium benzyloxide and potassium phenoxide; potassium salts of isovaleric acid, caprylic acid, lauric acid, palmitic acid, stearic acid, oleic acid, linolenic acid, benzoic acid, phthalic acid and 2-ethylhexoic acid; potassium salts of organic sulfonic acids such as dodecylbenzenesulfonic acid, tetradecylbenzenesulfonic acid, hexadecylbenzenesulfonic acid and octadecylbenzenesulfonic acid; potassium salts of organic phosphorous acids such as diethyl phosphite, duisopropyl phosphate, diphenyl phosphate, dibutyl phosphate and dilauryl phosphate; and the like.

The potassium compound may be added in an amount of 0.005 to 0.5 mole based on the equivalent of 1 g of lithium atoms of the organic lithium compound used in the formation of an initiator. When the amount is smaller than 0.005 mole, effects obtained by adding the potassium compound (the improvement of the reactivity of the initiator, the random arrangement of the aromatic vinyl compound and the provision of a single chain) are not obtained. On the other hand, when the amount is larger than 0.5 mole, the polymerization activity lowers, thereby not only reducing productivity greatly but also reducing modification efficiency when a reaction for modifying the terminal of the polymer with a functional group is carried out.

When the polymer of the present invention is polymerized using an alkali metal amide initiator, an alkali metal alkoxide compound may be added together with a polymerization initiator to improve polymerization reactivity as well as reaction efficiency between the active terminal of a polymer and a modifier (coupling agent). The alkali metal alkoxide compound may be produced through a reaction between an alcohol having a corresponding structure and an organic alkali metal compound, and this reaction may be carried out in the presence of the monomer before a conjugated diolefin and an aromatic vinyl compound are copolymerized in a hydrocarbon solvent.

Preferred examples of the alkali metal alkoxide compound include tetrahydrofurfuryl alcohol, N,N-dimethyl ethanolamine, N,N-diethyl ethanolamine, 1-piperazine ethanolamine and the like.

The organic alkali metal compound to be reacted with an alcohol compound to produce an alkali metal alkoxide is preferably an organic lithium compound. Specific examples of the organic lithium compound include ethyl lithium, propyl lithium, n-butyl lithium, sec-butyl lithium, t-butyl lithium, hexyl lithium, and mixtures thereof. Of these, n-butyl lithium and sec-butyl lithium are preferred.

The molar ratio of the alcohol compound to the organic lithium compound must be 1:0.7 to 5.0, preferably 1:0.8 to 2.0, more preferably 1:0.9 to 1.2. When the molar ratio of the organic lithium compound is larger than 5.0, the effect of improving tensile strength, abrasion resistance and hysteresis-loss characteristics cannot be obtained. On the other hand, when the molar ratio is smaller than 0.8, the polymerization speed remarkably lowers, thereby not only reducing productivity sharply but also reducing modification efficiency when a reaction for modifying the terminal of a polymer with a functional group is carried out.

In the present invention, when the conjugated diolefin compound such as 1,3-butadiene or isoprene is added in an amount of 1 to 100 times, preferably 1 to 50 times the number of moles of the initiator component to prepare an initiator which is the reaction product of the secondary amine compound or tertiary amine compound and the organic lithium compound, a polymerization reaction swiftly starts advantageously.

The Mooney viscosity (ML1+4, 100° C. of the copolymer rubber obtained in the present invention is preferably in the range of 20 to 200. When the Mooney viscosity is less than 20, tensile strength, abrasion resistance and hysteresis-loss characteristics deteriorate, while when the Mooney viscosity is more than 200, processability degrades. A polymer having a Mooney viscosity (ML1+4, 100° C.) of more than 100 is inferior in processability as it is, disadvantageously. However, when extender oil such as aromatic process oil or naphthene-based process oil, or a liquid polymer having an average molecular weight of 150,000 or less is added to the polymer, the Mooney viscosity can be reduced to 100 or less and the polymer can be used without a problem in processability. However, when aromatic process oil having a viscosity-gravity constant of more than 0.950 is added to a polymer that is modified or coupled with a tin compound as the component (g), the tin-carbon bond is easily broken. Therefore, the addition of extender oil having a viscosity-gravity constant (VGC) of at least 0.800 to 0.950 or liquid rubber is preferred.

The copolymer rubber to be obtained in the present invention can be isolated from a polymer reaction solution containing the copolymer rubber obtained in the present invention by a method which is used for general solution polymerization, for example, a method comprising adding to the solution a stabilizer and then extender oil such as aromatic process oil or naphthene-based process oil, or a liquid polymer (or a solution of the liquid polymer) having an average molecular weight of 150,000 or less as required, separating the solvent from rubber by a direct drying method or steam striping method, washing the rubber and drying it with a vacuum drier, hot air drier or roll.

The copolymer rubber of the present invention may be used alone; or it may be blended with natural rubber, polyisoprene rubber, polybutadiene rubber or emulsion-polymerized styrene-butadiene rubber, kneaded with a reinforcement such as carbon black or silica and various compounding ingredients by a roll or Banbury mixer and mixed with sulfur or a vulcanization accelerator to be used not only as rubber for tires such as a tread, sidewall and carcass but also as a belt, vibration-proof rubber or other industrial product.

The reinforcement which is used when the copolymer rubber of the present invention is used as a tire, especially a tire tread, is carbon black or silica.

Particularly, when high abrasion resistance and tensile strength are desired to reinforce a vulcanizate effectively, carbon black is advantageously used. The amount of the carbon black used is preferably 20 to 110 parts by weight based on 100 parts by weight of all rubber components.

Especially for low fuel consumption tires, silica reduces the hysteresis-loss of a vulcanizate not only to provide high rolling resistance but also improve wet skid resistance. The amount of silica used is preferably 20 to 120 parts by weight based on 100 parts by weight of all rubber components.

Further, when silica is used as a filler, various known silane coupling agents can be used to improve the reinforcing effect of silica. The silane coupling agent refers to a compound having a constituent component which can react with the surface of silica, such as an alkoxysilyl group, and a constituent component which can react with rubber, particularly with carbon-carbon double bond, such as polysulfide, mercapto group or epoxy group in the molecule. For example, bis-(3-triethoxysilylpropyl)tetrasulfide is well known as a silane coupling agent.

When a combination of carbon black and silica is used in an amount of 20 to 120 parts by weight based on 100 parts by weight of all rubber components, high abrasion resistance and tensile strength as well as good balance between hysteresis-loss characteristics and wet grip performance can be achieved.

When the copolymer rubber of the present invention is blended with a carbon-silica dual phase filler, the same excellent advantage as obtained when carbon black and silica are both used can be obtained.

The carbon-silica dual phase filler is so-called "silica-coating carbon black" which has silica chemically bound to the surface of carbon black and is marketed by Cabot Co., Ltd. under the trade name of CRX2000, CRX2002 and CRX2006.

The amount of the carbon-silica dual phase filler used is preferably 1 to 100 parts by weight, more preferably 5 to 95 parts by weight, based on 100 parts by weight of all rubber components.

In the present invention, the carbon-silica dual phase filler can be used in conjunction with other filler. Illustrative examples of such filler include carbon black, silica, calcium carbonate and magnesium carbonate. They can be used without restriction. Of these, carbon black and silica are preferred.

The filler is preferably used in an amount of 3 to 100 parts by weight, particularly preferably 5 to 95 parts by weight, based on 100 parts by weight of all rubber components.

EXAMPLES

The following examples are given to further illustrating the present invention but by no means limit the scope thereof.

Measurements in the following examples were made in accordance with the following methods.

Microstructure of conjugated diolefin

This was obtained by infrared absorption spectroscopy (Morero's method).

Content of bound styrene

This was obtained by formulating a calibration curve by infrared absorption spectroscopy.

Glass transition temperature

This was measured in accordance with ASTM D3418.

Weight average molecular weight

This was obtained in terms of polystyrene by gel permeation chromatography (GPC) (Model 244 of Water Co., Ltd.).

Mooney viscosity

This was measured by preheating at a temperature of 100° C. for 1 minute with an L rotor with an operation time of 4 minutes in accordance with JIS K6300.

Coupling efficiency

This was calculated from a peak area ratio of a polymer before coupling and a polymer whose molecular weight is increased by coupling based on a GPC curve obtained by gel permeation chromatography (GPC) (Model 244 of Water Co., Ltd.).

Content of amino groups bound to polymer (mmol/g of copolymer rubber)

A polymer was first dissolved in toluene and precipitated in a large amount of methanol to separate an amino group-containing compound which was not bound to copolymer rubber from the rubber, and the amino-group containing compound was dried. The content of the copolymer rubber that had been subjected to this treatment as a sample was determined in accordance with "Acid-base titration method in organic solvent using erchloric acid-acetic acid solution", Robert T. Keen, James S. Fritz, J. Anal. Chem,. vol. 24, pp. 564 (1952). Chloroform was used as a solvent for dissolving the sample and methyl violet was used as a titration reagent to determine the content of the copolymer rubber from a calibration curve formulated with a tri-n-octylamine solution whose concentration is known. The content (mmol/g of copolymer rubber) of amino groups bound to a polymer was determined by dividing the determined content value (mmol) by the weight of the polymer used for analysis.

Evaluation of physical properties of vulcanizate

Raw material rubber was kneaded with a 250-cc lab plastomill in accordance with formulation shown in Table 1, and a vulcanizate that had been vulcanized at 145° C. for a predetermined amount of time was used for various measurements.

TABLE 1

| composition | A low carbon black-loaded compound | B high carbon black-loaded compound | C high silica-loaded compound | D high filler (carbon black and silica)-loaded compound |
|---|---|---|---|---|
| natural rubber | 30 | 20 | 20 | 50 |
| (S)SBR | 70 | 80 | 80 | 50 |
| highly aromatic extender oil | 0 | 37.5 | 37.5 | 37.5 |
| carbon black | 45 | 75 | | 30 |
| spherical silica | | | 75 | 45 |
| silane coupling agent | | | 6 | 4 |
| stearic acid | 2 | 2 | 2 | 2 |
| zinc oxide | 3 | 3 | 3 | 3 |
| antioxidant IPPD | 1 | 1 | 1.5 | 1.5 |
| vulcanization accelerator | | | | |
| NaBDC | 0.8 | | | |
| DPG | 0.6 | | 1.5 | 0.7 |
| MBTS | 1.2 | 1 | | |
| BBS | | 0.5 | | |
| CBS | | | 1.2 | 1.5 |
| sulfur | 1.5 | 1.5 | 1.5 | 1.5 |

Notes)
(S)SBR: indicates only the amount of a rubber portion obtained by removing an oil component from oil-extended rubber when the oil-extended (S)SBR is used.
extender oil: indicates the total of the amount of extender oil contained in the oil-extended rubber and the amount of extender oil added additionally at the time of blending when the oil-extended (S)SBR is used.
carbon black: Dia Black N339 of Mitsubishi Chemical Co., Ltd.
spherical silica: Nip Seal AQ of Nippon Silica Co., Ltd.
silane coupling agent: bis-(3-triethoxysilylpropyl)tetrasulfide
IPPD: N-phenyl-N'-isopropyl-p-phenylene diamine
NaBDC: sodium-dibutyl dithiocarbamate
DPG: diphenylguanidine
MBTS: dibenzothiazyldisulfide
BBS: N-tert-butyl-2-benzothiazolylsulfamide
CBS: N-cyclohexyl-2-benzothiazylsulfamide Tensile strength This was measured in accordance with JIS K6301.

tanδ (50° C.), tanδ (0° C.)

Using the dynamic spectrometer of Leometrix Co., Ltd. of the US, tanδ (50° C.) was measured at a strain under torsion of 1%, a frequency of 10 Hz and a temperature of 50° C. This is expressed as an index. The larger the index value the smaller and better the rolling resistance is. Tanδ (0° C.) was measured at a strain under torsion of 0.1%, a frequency of 10 Hz and a temperature of 0° C. using the same device. This is expressed as an index. The larger the index value the larger and better the wet skid resistance is.

Lambourn abrasion Index

Using a Lambourn abrasion tester, this was expressed as an amount of abrasion with a slip rate of 25%, and the measurement temperature was room temperature. The larger the index value the larger the abrasion resistance is.

Processability

The unity and gloss of damp rubber after kneading were inspected visually and evaluated.

Example 1

20 Grams of cyclohexane, 5 g of tetrahydrofuran and 4.84 mmol of di-n-butylamine as a secondary amine were charged into a 100-ml pressure bottle that has been fully substituted with nitrogen, and the bottle was stoppered. Then, 4.84 mmol of n-butyl lithium was added to carry out a reaction at 50° C. for 15 minutes, and 1.39 g (25.8 mmol) of 1,3-butadiene was further added to carry out a reaction for another 15 minutes.

Thereafter, 2,500 g of cyclohexane, 23.13 g of tetrahydrofuran, 100 g of styrene and 390 g of 1,3-butadiene were charged into a 5-liter autoclave that has been fully substituted with nitrogen. After the temperature of the contents of the autoclave was adjusted to 10° C., the whole amount of the above initiator solution was added to initiate polymerization.

After the polymerization conversion reached 100%, 10 g of 1,3-butadiene was added to carry out a reaction for 5 minutes to convert the terminal of a polymer into butadienyl lithium, and 0.91 mmol of tin tetrachloride was added to carry out a coupling reaction for 15 minutes. The production conditions are shown in Table 2. After the reaction, 2,6-di-t-butyl-p-cresol was added to the polymer solution to remove the solvent by steam-stripping, and the obtained rubber was dried with a roll of 115° C. The physical properties of the obtained copolymer rubber (to be referred to as "polymer A-1" hereinafter) are shown in Table 3.

Example 2

Copolymer rubber (to be referred to as "polymer B-1" hereinafter) was obtained in accordance with the same formulation as the polymer A-1 except that 4.84 mmol of pyrrolidine(tetramethyleneimine) was used in place of 4.84 mmol of di-n-butylamine as a secondary amine. The production conditions and physical properties of the polymer B-1 are shown in Table 2 and Table 3, respectively.

Example 3

Copolymer rubber (to be referred to as "polymer C-1" hereinafter) was obtained in accordance with the same formulation as the polymer B-1 except that 4.84 mmol of pyrrolidine(tetramethyleneimine) was added to a 5-liter autoclave filled with cyclohexane, tetrahydrofuran, 1,3-butadiene and styrene and then 4.84 mmol of n-butyl lithium was added to the autoclave. The production conditions and physical properties of the polymer C-1 are shown in Table 2 and Table 3, respectively.

Example 4

Copolymer rubber (to be referred to as "polymer D-1" hereinafter) was obtained in accordance with the same formulation as the polymer C-1 except that 2.42 mmol of N,N-diethyl ethanolamine was charged into an autoclave and then 7.26 mmol of n-butyl lithium was added to the autoclave. The production conditions and physical properties of the polymer D-1 are shown in Table 2 and Table 3, respectively.

Examples 5 to 12 and Comparative Examples 1 to 6

Polymers were obtained in accordance with the same formulation as the polymer C-1 except that the amounts of tetrahydrofuran, 1,3-butadiene, styrene, pyrrolidine (tetramethyleneimine), n-butyl lithium and modifier were changed as shown in Table 2 and the polymerization temperature was adjusted as shown in Table 3. The production conditions and physical properties of the polymers are shown in Table 2 and Table 3, respectively.

Example 13

Copolymer rubber (to be referred to as "polymer M-1" hereinafter) was obtained in accordance with the same formulation as the polymer A-1 except that 4.84 mmol of N,N-dimethyl-o-toluidine was used in place of 4.84 mmol of di-n-butylamine to prepare an initiator in a pressure bottle and that 1.82 mmol of dioctyltin dichloride was used in place of 0.91 mmol of tin tetrachloride as a coupling agent to be used in a coupling reaction after polymerization. The production conditions and physical properties of the polymer M-1 are shown in Table 2 and Table 3, respectively.

Example 14

Copolymer rubber (to be referred to as "polymer N-1" hereinafter) was obtained in accordance with the same formulation as the polymer A-1 except that 4.84 mmol of vinylbenzyl dimethylamine (VBDMA) was used in place of 4.84 mmol of di-n-butylamine to prepare an initiator in a pressure bottle and that 1.82 mmol of dioctyltin dichloride was used in place of 0.91 mmol of tin tetrachloride as a coupling agent to be used in a coupling reaction after polymerization. The production conditions and physical properties of the polymer N-1 are shown in Table 2 and Table 3, respectively.

Example 15 and Comparative Example 7

Polymer solutions were obtained in the same manner as the polymer C-1 except that the amounts of tetrahydrofuran, 1,3-butadiene, styrene, pyrrolidine(tetramethyleneimine), n-butyl lithium and modifier were changed as shown in Table 2 and the polymerization temperature was adjusted as shown in Table 3. After 37.5 parts by weight of solution-polymerized SBR rubber (vinyl content=62%, amount of bond ST=25%, weight average molecular weight (Mw)=10,000, ratio (Mw/Mn) of weight average molecular weight (Mw) to number average molecular weight (Mn)=1.05) was added based on 100 parts by weight of a polymer contained in each of the obtained polymer solutions, 2,6-di-t-butyl-p-cresol was added to remove the solvent by steam-stripping, and rubber was dried with a roll of 115° C. The production conditions and physical properties of the obtained polymers are shown in Table 2 and Table 3, respectively.

Example 16 and Comparative Example 8

Polymer solutions were obtained in the same manner as the polymer C-1 except that the amounts of tetrahydrofuran, 1,3-butadiene, styrene, pyrrolidine(tetramethyleneimine), n-butyl lithium and modifier were changed as shown in Table 2 and the polymerization temperature was adjusted as shown in Table 3. After 37.5 parts by weight of aromatic oil was added based on 100 parts by weight of a polymer contained in each of the obtained polymer solutions, 2,6-di-t-butyl-p-cresol was added to remove the solvent by steam-stripping, and rubber was dried with a roll of 115° C. The production conditions and physical properties of the polymers are shown in Table 2 and Table 3, respectively.

TABLE 2

| Ex. | polymer No. | amine compound | mmol | other additive | mmol | organic lithium n-BuLi mmol | tetrahydrofuran g | butadiene g | styrene g |
|---|---|---|---|---|---|---|---|---|---|
| 1 | A-1 | di-n-butylamide | 4.84 | none | 0.00 | 4.84 | 23.13 | 390 | 100 |
| 2 | B-1 | pyrrolidine | 4.84 | none | 0.00 | 4.84 | 23.13 | 390 | 100 |
| 3 | C-1 | pyrrolidine | 4.84 | none | 0.00 | 4.84 | 23.13 | 390 | 100 |
| 4 | D-1 | pyrrolidine | 4.84 | N,N-diethyl ethanolamine | 2.42 | 7.26 | 23.13 | 390 | 100 |
| 5 | E-1 | pyrrolidine | 4.84 | none | 0.00 | 4.84 | 23.13 | 390 | 100 |
| 6 | F-1 | pyrrolidine | 4.84 | none | 0.00 | 4.84 | 23.13 | 390 | 100 |
| 7 | G-1 | pyrrolidine | 4.84 | none | 0.00 | 4.84 | 23.13 | 390 | 100 |
| 8 | H-1 | pyrrolidine | 4.84 | none | 0.00 | 4.84 | 23.13 | 390 | 100 |
| 9 | I-1 | pyrrolidine | 4.84 | none | 0.00 | 4.84 | 23.13 | 390 | 100 |
| 10 | J-1 | pyrrolidine | 4.84 | none | 0.00 | 4.84 | 50.00 | 415 | 75 |
| 11 | K-1 | pyrrolidine | 4.84 | none | 0.00 | 4.84 | 17.50 | 355 | 135 |
| 12 | L-1 | pyrrolidine | 4.84 | none | 0.00 | 4.84 | 16.00 | 415 | 75 |
| 13 | M-1 | N,N-dimethyl-o-toluidine | 4.84 | none | 0.00 | 4.84 | 23.13 | 390 | 100 |
| 14 | N-1 | VBDMA | 4.84 | none | 0.00 | 4.84 | 23.13 | 390 | 100 |
| 15 | O-1 | pyrrolidine | 4.14 | none | 0.00 | 4.14 | 23.13 | 390 | 100 |
| 16 | P-1 | pyrrolidine | 4.14 | none | 0.00 | 4.14 | 23.13 | 390 | 100 |

| Ex. | additional butadiene (during polymerization) g | additional butadiene (addition before modification) g | modifier.coupling agent | mmol | remarks |
|---|---|---|---|---|---|
| 1 | 0 | 10 | tin tetrachloride | 0.91 | An initiator is prepared in another pot. |
| 2 | 0 | 10 | tin tetrachloride | 0.91 | An initiator is prepared in another pot. |
| 3 | 0 | 10 | tin tetrachloride | 0.91 | |
| 4 | 0 | 10 | tin tetrachloride | 0.91 | N,N-diethyl ethanolamine is added. |
| 5 | 0 | 10 | N,N,N',N'-tetramethyloxamide | 1.82 | |
| 6 | 0 | 10 | 3,5-diacetylpyridine | 1.82 | |
| 7 | 0 | 10 | diethyl adipate | 1.04 | |
| 8 | 0 | 10 | N,N,N',N'-tetramethyl-3,5-pyridine dicarboxyamide | 1.82 | |
| 9 | 0 | 10 | dioctyltin dichloride | 1.82 | |
| 10 | 0 | 10 | dioctyltin dichloride | 1.82 | |
| 11 | 0 | 10 | dioctyltin dichloride | 1.82 | |
| 12 | 0 | 10 | dioctyltin dichloride | 1.82 | |
| 13 | 0 | 10 | dioctyltin dichloride | 1.82 | An initiator is prepared in another pot. |
| 14 | 0 | 10 | dioctyltin dichloride | 1.82 | An initiator is prepared in another pot. |
| 15 | 0 | 10 | silicon tetrachloride | 0.78 | |
| 16 | 0 | 10 | silicon tetrachloride | 0.78 | |

| C.Ex. | polymer No. | amine compound | mmol | other additive | mmol | organic lithium n-BuLi mmol | tetrahydrofuran g | butadiene g | styrene g |
|---|---|---|---|---|---|---|---|---|---|
| 1 | Q-1 | none | 0.00 | none | 0.00 | 4.53 | 23.13 | 390 | 100 |
| 2 | R-1 | pyrrolidine | 1.02 | none | 0.00 | 4.68 | 23.13 | 390 | 100 |
| 3 | S-1 | pyrrolidine | 4.84 | none | 0.00 | 4.84 | 75.00 | 490 | 10 |
| 4 | T-1 | pyrrolidine | 4.84 | none | 0.00 | 4.84 | 16.25 | 275 | 175 |
| 5 | U-1 | pyrrolidine | 4.84 | none | 0.00 | 4.84 | 10.00 | 300 | 135 |
| 6 | V-1 | pyrrolidine | 4.84 | none | 0.00 | 4.84 | 23.13 | 390 | 100 |
| 7 | W-1 | none | 0.00 | none | 0.00 | 3.43 | 23.13 | 390 | 100 |
| 8 | X-1 | none | 0.00 | none | 0.00 | 4.06 | 23.13 | 390 | 100 |

| C.Ex. | additional butadiene (during polymerization) g | additional butadiene (addition before modification) g | modifier.coupling agent | mmol | remarks |
|---|---|---|---|---|---|
| 1 | 0 | 10 | dioctyltin dichloride | 1.81 | An n-butyl lithium initiator is used. |
| 2 | 0 | 10 | dioctyltin dichloride | 1.81 | Both N-butyl lithium initiator and pyrrolidine lithium initiator are used. |
| 3 | 0 | 0 | dioctyltin dichloride | 1.81 | |
| 4 | 50 | 0 | dioctyltin dichloride | 1.81 | |
| 5 | 65 | 0 | dioctyltin dichloride | 1.81 | |
| 6 | 0 | 10 | N,N,N',N'-tetraethyl | 2.57 | |

TABLE 2-continued

|   |   |    | diaminobenzophenone  |      |                                  |
|---|---|----|----------------------|------|----------------------------------|
| 7 | 0 | 10 | silicon tetrachloride | 0.76 | An n-butyl lithium initiator is used. |
| 8 | 0 | 10 | silicon tetrachloride | 0.76 | An n-butyl lithium initiator is used. |

Ex.: Example
C.Ex.: Comparative Example

TABLE 3

| Ex. | polymer No. | polymerization start temperature (°C.) | polymerization maximum temperature (°C.) | content of amino groups (N) (mmol/g · polymer) | content of vinyl (%) | content of styrene (%) | glass transition temperature (°C.) |
|-----|------|----|----|--------|----|----|-----|
| 1   | A-1  | 10 | 85 | 0.0095 | 62 | 20 | −36 |
| 2   | B-1  | 10 | 86 | 0.0095 | 62 | 20 | −36 |
| 3   | C-1  | 10 | 88 | 0.0095 | 61 | 20 | −37 |
| 4   | D-1  | 10 | 85 | 0.0096 | 62 | 20 | −36 |
| 5   | E-1  | 10 | 87 | 0.0094 | 61 | 20 | −36 |
| 6   | F-1  | 10 | 88 | 0.0096 | 61 | 20 | −37 |
| 7   | G-1  | 10 | 86 | 0.0095 | 62 | 20 | −36 |
| 8   | H-1  | 10 | 85 | 0.0094 | 62 | 20 | −35 |
| 9   | I-1  | 10 | 89 | 0.0095 | 61 | 20 | −37 |
| 10  | J-1  | 10 | 83 | 0.0095 | 71 | 15 | −34 |
| 11  | K-1  | 10 | 90 | 0.0095 | 58 | 27 | −28 |
| 12  | L-1  | 13 | 85 | 0.0094 | 57 | 15 | −51 |
| 13  | M-1  | 15 | 92 | 0.0095 | 62 | 20 | −36 |
| 14  | N-1  | 10 | 87 | 0.0095 | 62 | 20 | −36 |
| 15  | O-1  | 10 | 87 | 0.0079 | 62 | 20 | −36 |
| 16  | P-1  | 10 | 85 | 0.0082 | 61 | 20 | −36 |

| Ex. | GPC pattern | modifier | coupling efficiency (%) | extender oil (parts by weight) | liquid rubber (parts by weight) | mooney viscosity |
|-----|-------------|----------|--------|---|------|-----|
| 1   | bimodal | tin tetrachloride | 67 | 0 | 0 | 73 |
| 2   | bimodal | tin tetrachloride | 68 | 0 | 0 | 74 |
| 3   | bimodal | tin tetrachloride | 67 | 0 | 0 | 73 |
| 4   | bimodal | tin tetrachloride | 74 | 0 | 0 | 75 |
| 5   | bimodal | N,N,N',N'-tetramethyloxamide | 62 | 0 | 0 | 63 |
| 6   | bimodal | 3,5-diacetylpyridine | 63 | 0 | 0 | 65 |
| 7   | bimodal | diethyl adipate | 63 | 0 | 0 | 71 |
| 8   | bimodal | N,N,N',N'-tetramethyl-3,5-pyridine dicarboxyamide | 68 | 0 | 0 | 69 |
| 9   | bimodal | dioctyltin dichloride | 67 | 0 | 0 | 68 |
| 10  | bimodal | dioctyltin dichloride | 65 | 0 | 0 | 66 |
| 11  | bimodal | dioctyltin dichloride | 66 | 0 | 0 | 67 |
| 12  | bimodal | dioctyltin dichloride | 62 | 0 | 0 | 66 |
| 13  | bimodal | dioctyltin dichloride | 63 | 0 | 0 | 73 |
| 14  | bimodal | dioctyltin dichloride | 64 | 0 | 0 | 71 |
| 15  | bimodal | silicon tetrachloride | 68 | 0 | 37.5 | 38* |
| 16  | bimodal | silicon tetrachloride | 65 | 37.5 | 0 | 41* |

| C.Ex. | polymer No. | polymerization start temperature (°C.) | polymerization maximum temperature (°C.) | content of amino groups (N) (mmol/g · polymer) | content of vinyl (%) | content of styrene (%) | glass transition temperature (°C.) |
|-------|------|----|----|--------|----|----|-----|
| 1 | Q-1 | 10 | 84 | 0.0000 | 62 | 20 | −35 |
| 2 | R-1 | 10 | 88 | 0.0020 | 61 | 21 | −36 |
| 3 | S-1 | 10 | 90 | 0.0095 | 77 | 2  | 53  |
| 4 | T-1 | 30 | 74 | 0.0095 | 57 | 35 | −22 |
| 5 | U-1 | 13 | 87 | 0.0094 | 46 | 27 | −33 |
| 6 | V-1 | 10 | 89 | 0.0095 | 61 | 20 | −36 |
| 7 | W-1 | 10 | 86 | 0.0000 | 62 | 20 | −34 |
| 8 | X-1 | 10 | 88 | 0.0000 | 61 | 20 | −35 |

| C.Ex. | GPC pattern | modifier | coupling efficiency (%) | extender oil (parts by weight) | liquid rubber (parts by weight) | mooney viscosity |
|-------|-------------|----------|----|---|---|----|
| 1 | bimodal | dioctyltin dichloride | 72 | 0 | 0 | 69 |
| 2 | bimodal | dioctyltin dichloride | 69 | 0 | 0 | 67 |
| 3 | bimodal | dioctyltin dichloride | 69 | 0 | 0 | 65 |
| 4 | bimodal | dioctyltin dichloride | 65 | 0 | 0 | 66 |
| 5 | bimodal | dioctyltin dichloride | 66 | 0 | 0 | 66 |
| 6 | monomodal | N,N,N',N'-tetraethyl | —  | 0 | 0 | 60 |

TABLE 3-continued

|   |   | diaminobenzophenone |    |      |      |     |
|---|---|---|---|---|---|---|
| 7 | bimodal | silicon tetrachloride | 67 | 0 | 37.5 | 40* |
| 6 | bimodal | silicon tetrachloride | 68 | 37.5 | 0 | 42* |

Ex.: Example
C.Ex.: .Comparative Example
Notes)
Mooney viscosity is measured at ML1 + 4, 100° C.
*indicates Mooney viscosity after oil extension.

EVALUATION OF PHYSICAL PROPERTIES OF RUBBER COMPOSITION

Reference Examples 1 to 14 and Comparative Reference Examples 1 to 5 (having a low content of carbon black)

Styrene-butadiene copolymer rubber containing no extender oil and no liquid rubber was vulcanized under conditions shown in A of Table 1, and the physical properties of the vulcanized copolymer rubber were evaluated. Tensile strength, tanδ (0° C.), tanδ (50° C.) and Lambourn abrasion are expressed as indices when the values of Comparative Reference Example 1 (polymer Q-1) are taken as 100. The larger the values the better these physical properties are.

The polymers used for evaluation and the evaluation results of their physical properties are shown in Table 4.

TABLE 4

| | | polymer | | | | |
|---|---|---|---|---|---|---|
| composition A | No. | initiator | modifier | vinyl (%) | ST (%) | coupling efficiency (%) |
| Ref.Ex.1 | A-1 | di-n-butyl lithium amide | tin tetrachloride | 62 | 20 | 67 |
| Ref.Ex.2 | B-1 | pyrrolidine lithium | tin tetrachloride | 62 | 20 | 68 |
| Ref.Ex.3 | C-1 | pyrrolidine lithium | tin tetrachloride | 61 | 20 | 67 |
| Ref.Ex.4 | D-1 | pyrrolidine lithium | tin tetrachloride | 62 | 20 | 74 |
| Ref.Ex.5 | E-1 | pyrrolidine lithium | N,N,N',N'-tetramethyl oxamide | 61 | 20 | 62 |
| Ref.Ex.6 | F-1 | pyrrolidine lithium | 3,5-diacetylpyridine | 61 | 20 | 63 |
| Ref.Ex.7 | G-1 | pyrrolidine lithium | diethyl adipate | 62 | 20 | 63 |
| Ref.Ex.8 | H-1 | pyrrolidine lithium | N,N,N',N'-tetramethyl-3,5-pyridine dicarboxyamide | 62 | 20 | 68 |
| Ref.Ex.9 | I-1 | pyrrolidine lithium | dioctyltin dichloride | 61 | 20 | 67 |
| Ref.Ex.10 | J-1 | pyrrolidine lithium | dioctyltin dichloride | 71 | 15 | 65 |
| Ref.Ex.11 | K-1 | pyrrolidine lithium | dioctyltin dichloride | 58 | 27 | 66 |
| Ref.Ex.12 | L-1 | pyrrolidine lithium | dioctyltin dichloride | 57 | 15 | 62 |
| Ref.Ex.13 | M-1 | N,N-dimethyl-o-toluidine lithium | dioctyltin dichloride | 62 | 20 | 63 |
| Ref.Ex.14 | N-1 | VBDMA-Li | dioctyltin dichloride | 62 | 20 | 64 |

| | polymer | | | | | | |
|---|---|---|---|---|---|---|---|
| composition A | glass transition temperature (° C.) | remarks | extrusion processability | tensile strength (index) | tan δ at 0° C. (index) | tan δ at 50° C. (index) | Lambourn abrasion (index) |
| Ref.Ex.1 | −36 | An initiator is prepared in another pot. | ⊙ | 108 | 115 | 110 | 102 |
| Ref.Ex.2 | −36 | An initiator is prepared in another pot. | ⊙ | 109 | 114 | 111 | 103 |
| Ref.Ex.3 | −37 | | ⊙ | 109 | 115 | 112 | 103 |
| Ref.Ex.4 | −36 | N,N-diethyl ethanolamine is added. | ⊙ | 110 | 114 | 112 | 104 |
| Ref.Ex.5 | −36 | | ○ | 105 | 113 | 107 | 100 |
| Ref.Ex.6 | −37 | | ○ | 105 | 114 | 106 | 100 |
| Ref.Ex.7 | −36 | | ○ | 105 | 113 | 108 | 100 |
| Ref.Ex.8 | −35 | | ○ | 104 | 113 | 107 | 100 |
| Ref.Ex.9 | −37 | | ⊙ | 110 | 114 | 119 | 109 |
| Ref.Ex.10 | −34 | | ⊙ | 99 | 118 | 113 | 103 |
| Ref.Ex.11 | −28 | | ⊙ | 115 | 123 | 112 | 104 |
| Ref.Ex.12 | −51 | | ⊙ | 99 | 102 | 123 | 112 |
| Ref.Ex.13 | −36 | | ⊙ | 107 | 113 | 113 | 105 |
| Ref.Ex.14 | −36 | | ⊙ | 107 | 114 | 113 | 104 |

TABLE 4-continued

| composition A | No. | initiator | modifier | vinyl (%) | ST (%) | coupling efficiency (%) |
|---|---|---|---|---|---|---|
| C.Ref.Ex.1 | Q-1 | n-BuLi | dioctyltin dichloride | 62 | 20 | 72 |
| C.Ref.Ex.2 | R-1 | pyrrolidine lithium/n-BuLi | dioctyltin dichloride | 61 | 21 | 69 |
| C.Ref.Ex.3 | S-1 | pyrrolidine lithium | dioctyltin dichloride | 77 | 2 | 69 |
| C.Ref.Ex.4 | T-1 | pyrrolidine lithium | dioctyltin dichloride | 57 | 35 | 65 |
| C.Ref.Ex.5 | V-1 | pyrrolidine lithium | N,N,N',N'-tetraethyl diaminobenzophenone | 61 | 20 | — |

| composition A | glass transition temperature (° C.) | remarks | extrusion processability | tensile strength (index) | tan δ at 0° C. (index) | tan δ at 50° C. (index) | Lambourn abrasion (index) |
|---|---|---|---|---|---|---|---|
| C.Ref.Ex.1 | −35 | An n-butyl lithium initiator is used. | ◉ | 100 | 100 | 100 | 100 |
| C.Ref.Ex.2 | −36 | Both n-butyl lithium initiator and pyrrolidine lithium initiator are used. | ◉ | 102 | 104 | 103 | 101 |
| C.Ref.Ex.3 | −53 | | ◉ | 88 | 91 | 117 | 97 |
| C.Ref.Ex.4 | −19 | | ◉ | 110 | 124 | 85 | 95 |
| C.Ref.Ex.5 | −36 | | X | 95 | 101 | 92 | 92 |

Ref.Ex.: Reference Example
C.Ref.Ex.: Comparative Reference Example

Reference Examples 15 to 19 and Comparative Reference Examples 6 to 8 (having a high content of carbon black)

Copolymer rubber was vulcanized under conditions shown in B of Table 1 and the physical properties of the vulcanized copolymer rubber were evaluated. Tensile strength, tanδ (0° C.), tanδ (50° C.) and Lambourn abrasion are expressed as indices when the values of Comparative Reference Example 6 (polymer Q-1) are taken as 100. The larger the values the better these physical properties are.

The polymers used for evaluation and the evaluation results of their physical properties are shown in Table 5.

TABLE 5

| composition B | No. | initiator | modifier | vinyl (%) | ST (%) | coupling efficiency (%) |
|---|---|---|---|---|---|---|
| Ref.Ex.15 | A-1 | di-n-butyl lithium amide | tin tetrachloride | 62 | 20 | 67 |
| Ref.Ex.16 | C-1 | pyrrolidine lithium | tin tetrachloride | 61 | 20 | 67 |
| Ref.Ex.17 | G-1 | pyrrolidine lithium | diethyl adipate | 62 | 20 | 63 |
| Ref.Ex.18 | I-1 | pyrrolidine lithium | dioctyltin dichloride | 61 | 20 | 67 |
| Ref.Ex.19 | O-1 | pyrrolidine lithium | silicon tetrachloride | 62 | 20 | 68 |
| C.Ref.Ex.6 | Q-1 | n-BuLi | dioctyltin dichloride | 62 | 20 | 72 |
| C.Ref.Ex.7 | R-1 | n-BuLi/pyrrolidine lithium | dioctyltin dichloride | 61 | 21 | 69 |
| C.Ref.Ex.8 | W-1 | n-BuLi | silicon tetrachloride | 62 | 20 | 67 |

| | glass transition temperature (° C.) | remarks | extrusion processability | tensile strength (index) | tan δ at 0° C. (index) | tan δ at 50° C. (index) | Lambourn abrasion (index) |
|---|---|---|---|---|---|---|---|
| Ref.Ex.15 | −36 | An initiator is prepared in another pot. | ◉ | 110 | 110 | 112 | 100 |
| Ref.Ex.16 | −37 | | ◉ | 113 | 109 | 115 | 100 |
| Ref.Ex.17 | −36 | | ○ | 109 | 108 | 111 | 99 |
| Ref.Ex.18 | −37 | | ○ | 113 | 109 | 121 | 102 |
| Ref.Ex.19 | −36 | extended with liquid rubber | ○ | 108 | 112 | 109 | 107 |
| C.Ref.Ex.6 | −35 | n-BuLi | ○ | 100 | 100 | 100 | 100 |
| C.Ref.Ex.7 | −36 | | ○ | 103 | 103 | 105 | 101 |
| C.Ref.Ex.8 | −34 | polymerized by an | ○ | 102 | 102 | 101 | 103 |

TABLE 5-continued n-BuLi initiator and
extended with
aromatic oil

Ref.Ex.: Reference Example
C.Ref.Ex.: Comparative Reference Example

Reference Examples 20 to 22 and Comparative Reference Examples 9 to 13 (having a high content of silica)

Styrene-butadiene copolymer rubber was vulcanized under conditions shown in C of Table 1 and the physical properties of the vulcanized copolymer rubber were evaluated. Tensile strength, tanδ (0° C.), tanδ (50° C.) and Lambourn abrasion are expressed as indices when the values of Comparative Reference Example 10 (polymer Q-1) are taken as 100. The larger the values the better these physical properties are.

The polymers used for evaluation and the evaluation results of their physical properties are shown in Table 6.

Reference Examples 23 to 25 and Comparative Reference Examples 14 to 18 (having high contents of carbon black and silica)

Styrene-butadiene copolymer rubber was vulcanized under conditions shown in D of Table 1 and the physical properties of the vulcanized copolymer rubber were evaluated. Tensile strength, tanδ (0° C.), tanδ (50° C.) and Lambourn abrasion are expressed as indices when the values of Comparative Reference Example 15 (polymer Q-1) are taken as 100. The larger the values the better these physical properties are.

The polymers used for evaluation and the evaluation results of their physical properties are shown in Table 7.

TABLE 6

| | | polymer | | | | |
|---|---|---|---|---|---|---|
| composition C | No. | initiator | modifier | vinyl (%) | ST (%) | coupling efficiency (%) |
| Ref.Ex.20 | I-1 | pyrrolidine lithium | dioctyltin dichloride | 61 | 20 | 67 |
| Ref.Ex.21 | O-1 | pyrrolidine lithium | silicon tetrachloride | 62 | 20 | 68 |
| Ref.Ex.22 | P-1 | pyrrolidine lithium | silicon tetrachloride | 61 | 20 | 65 |
| C.Ref.Ex.9 | U-1 | pyrrolidine lithium | dioctyltin dichloride | 40 | 27 | 66 |
| C.Ref.Ex.10 | Q-1 | n-BuLi | dioctyltin dichloride | 62 | 20 | 72 |
| C.Ref.Ex.11 | V-1 | pyrrolidine lithium | N,N,N',N'-tetraethyl diaminobenzophenone | 61 | 20 | — |
| C.Ref.Ex.12 | W-1 | n-BuLi | silicon tetrachloride | 62 | 20 | 67 |
| C.Ref.Ex.13 | X-1 | n-BuLi | silicon tetrachloride | 61 | 20 | 68 |

| | polymer | | | | | | |
|---|---|---|---|---|---|---|---|
| Composition C | glass transition temperature (° C.) | remarks | extrusion processability | tensile strength (index) | tan δ at 0° C. (index) | tan δ at 50° C. (index) | Lambourn abrasion (index) |
| Ref.Ex.20 | −35 | | ⊚ | 106 | 109 | 118 | 100 |
| Ref.Ex.21 | −36 | extended with liquid rubber | ○ | 104 | 110 | 107 | 108 |
| Ref.Ex.22 | −36 | extended with aromatic oil | ○ | 102 | 109 | 105 | 103 |
| C.Ref.Ex.9 | −38 | | ○ | 98 | 108 | 96 | 95 |
| C.Ref.Ex.10 | −35 | an n-butyl lithium initiator is used. | ⊚ | 100 | 100 | 100 | 100 |
| C.Ref.Ex.11 | −36 | | X | 89 | 96 | 92 | 94 |
| C.Ref.Ex.12 | −34 | polymerized by an n-BuLi initiator and extended with liquid rubber | ○ | 100 | 102 | 103 | 102 |
| C.Ref.Ex.13 | −35 | polymerized by an n-BuLi initiator and extended with aromatic oil | ○ | 99 | 101 | 101 | 101 |

Ref.Ex.: Reference Example
C.Ref.Ex.: Comparative Reference Example

TABLE 7

| composition D | No. | initiator | modifier | vinyl (%) | ST (%) | coupling efficiency (%) |
|---|---|---|---|---|---|---|
| Ref.Ex.23 | I-1 | pyrrolidine lithium | dioctyltin dichloride | 61 | 26 | 67 |
| Ref.Ex.24 | O-1 | pyrrolidine lithium | silicon tetrachloride | 62 | 20 | 68 |
| Ref.Ex.25 | P-1 | pyrrolidine lithium | silicon tetrachloride | 61 | 20 | 65 |
| C.Ref.Ex.14 | U-1 | pyrrolidine lithium | dioctyltin dichloride | 40 | 27 | 66 |
| C.Ref.Ex.15 | Q-1 | n-BuLi | dioctyltin dichloride | 62 | 20 | 72 |
| C.Ref.Ex.16 | V-1 | pyrrolidine lithium | N,N,N',N'-tetraethyl diaminobenzophenone | 61 | 20 | — |
| C.Ref.Ex.17 | W-1 | n-BuLi | silicon tetrachloride | 62 | 20 | 67 |
| C.Ref.Ex.18 | X-1 | n-BuLi | silicon tetrachloride | 61 | 20 | 68 |

| Composition D | polymer glass transition temperature (° C.) | remarks | extrusion processability | tensile strength (index) | tan δ at 0° C. (index) | tan δ at 50° C. (index) | Lambourn abrasion (index) |
|---|---|---|---|---|---|---|---|
| Ref.Ex.23 | −35 | | ⊚ | 109 | 109 | 120 | 101 |
| Ref.Ex.24 | −36 | extended with liquid rubber | ○ | 106 | 111 | 108 | 108 |
| Ref.Ex.25 | −36 | extended with aromatic oil | ○ | 101 | 109 | 106 | 104 |
| C.Ref.Ex.14 | −38 | | ○ | 95 | 107 | 96 | 95 |
| C.Ref.Ex.15 | −35 | An n-butyl lithium initiator is used. | ⊚ | 100 | 100 | 100 | 100 |
| C.Ref.Ex.16 | −36 | | X | 86 | 97 | 93 | 94 |
| C.Ref.Ex.17 | −34 | polymerized by an n-BuLi initiator and extended with liquid rubber | ○ | 101 | 102 | 102 | 102 |
| C.Ref.Ex.18 | −35 | polymerized by an n-BuLi initiator and extended with aromatic oil | ○ | 97 | 102 | 100 | 100 |

Ref.Ex.: Reference Example
C.Ref.Ex.: Comparative Reference Example

The following points are understood from Tables 4 to 7.

It is understood from the evaluation results of polymers having a low content of carbon black shown in Table 4 that the diolefin-based copolymer of the present invention having an amino group introduced to the terminal retain the same or higher abrasion resistance than a conventional polymer having no amino group introduced to the terminal as well as wet skid resistance (tanδ, 0° C.) and has improved balance among tensile strength, abrasion resistance and hysteresis-loss characteristics (tanδ, 50° C.).

It is also understood that the physical properties of the polymer which is polymerized with an amine-containing initiator are greatly improved by modifying the active terminal of the polymer with a tin compound, amide compound, pyridyl compound, ketone compound or ester compound to introduce a functional group to both terminals of a molecular chain efficiently.

The polymers of Comparative Reference Example 5 of Table 4, Comparative Reference Example 11 of Table 6 and Comparative Reference Example 16 of Table 7 are polymers having an amino group introduced to the terminal and a monomodal molecular weight distribution. It is seen that they have poor extrusion processability and are inferior in tensile strength, abrasion resistance and hysteresis-loss characteristics (tanδ, 50° C.).

It is also understood from the evaluation of polymers having a high content of carbon black shown in Table 5, the evaluation of polymers having a high content of silica shown in Table 6 and the evaluation of polymers having high contents of silica and carbon black shown in Table 7 that the polymers of the present invention have improved physical properties as compared with the polymers of the prior art.

Example 21

20 Grams of cyclohexane, 5 g of tetrahydrofuran, and 4.84 mmol of di-n-butylamine as a secondary amine were charged into a 100-ml pressure bottle that had been fully substituted with nitrogen, and the bottle was stoppered by a crown cap. Then, 4.84 mmol of n-butyl lithium was added to carry out a reaction at 50° C. for 15 minutes, and 1.39 g (25.8 mmol) of 1,3-butadiene was added to carry out a reaction for another 15 minutes.

Thereafter, 2,500 g of cyclohexane, 5.00 g of tetrahydrofuran, 175 g of styrene and 175 g of 1,3-butadiene were charged into a 5-liter autoclave that had been fully substituted with nitrogen. After the temperature of the contents of the autoclave was adjusted to 55° C., the whole amount of the above initiator solution was added to initiate polymerization.

After the start of polymerization, the yellow reaction solution became slightly reddish. At this point, 140 g of 1,3-butadiene was charged into the reactor continuously (the charging rate was adjusted to prevent the color of the solution from becoming red).

After the polymerization conversion reached 100%, 10 g of 1,3-butadiene was added to carry out a reaction for 5 minutes to convert the terminal of a polymer into butadienyl lithium, and 0.91 mmol of tin tetrachloride was added to carry out a coupling reaction for 15 minutes. The production conditions are shown in Table 8. After the reaction, 2,6-dit-butyl-p-cresol was added to the polymer solution to remove the solvent by steam-stripping, and the obtained rubber was dried with a roll of 115° C. The physical properties of the obtained copolymer rubber (to be referred to as "polymer A-2" hereinafter) are shown in Table 9.

Example 22

Copolymer rubber (to be referred to as "polymer B-2" hereinafter) was obtained in accordance with the same formulation as the polymer A-2 except that 4.84 mmol of pyrrolidine(tetramethyleneimine) was used in place of 4.84 mmol of di-n-butylamine as a secondary amine. The production conditions and physical properties of the polymer B-2 are shown in Table 8 and Table 9, respectively.

Example 23

Copolymer rubber (to be referred to as "polymer C-2" hereinafter) was obtained in accordance with the same formulation as the polymer B-2 except that 4.84 mmol of pyrrolidine(tetramethyleneimine) was added to a 5-liter autoclave filled with cyclohexane, tetrahydrofuran, 1,3-butadiene and styrene and then 4.84 mmol of n-butyl lithium was added to the autoclave. The production conditions and physical properties of the polymer C-2 are shown in Table 8 and Table 9, respectively.

Example 24

Copolymer rubber (to be referred to as "polymer D-2" hereinafter) was obtained in accordance with the same formulation as the polymer C-2 except that 2.42 mmol of N,N-diethyl ethanolamine was charged into an autoclave and then 7.26 mmol of n-butyl lithium was added to the autoclave. The production conditions and physical properties of the polymer D-2 are shown in Table 8 and Table 9, respectively.

Examples 25 to 32 and Comparative Examples 11 to 17

Polymers were obtained in accordance with the same formulation as the polymer C-2 except that the amounts of tetrahydrofuran, 1,3-butadiene, styrene, pyrrolidine (tetramethyleneimine), n-butyl lithium and modifier were changed as shown in Table 8 and the polymerization temperature was adjusted as shown in Table 9. The production conditions and physical properties of the polymers are shown in Table 8 and Table 9, respectively.

Example 33

Copolymer rubber (to be referred to as "polymer M-2" hereinafter) was obtained in accordance with the same formulation as the polymer A-2 except that 4.84 mmol of N,N-dimethyl-o-toluidine was used in place of 4.84 mmol of di-n-butylamine to prepare an initiator in a pressure bottle and that 1.82 mmol of dioctyltin dichloride was used in place of 0.91 mmol of tin tetrachloride as a coupling agent to be used in a coupling reaction after polymerization. The production conditions and physical properties of the polymer M-2 are shown in Table 8 and Table 9, respectively.

Example 34

Copolymer rubber (to be referred to as "polymer N-2" hereinafter) was obtained in accordance with the same formulation as the polymer A-2 except that 4.84 mmol of vinylbenzyl dimethylamine (VBDMA) was used in place of 4.84 mmol of di-n-butylamine to prepare an initiator in a pressure bottle and that 1.82 mmol of dioctyltin dichloride was used in place of 0.91 mmol of tin tetrachloride as a coupling agent to be used in a coupling reaction after polymerization. The production conditions and physical properties of the polymer N-2 are shown in Table 8 and Table 9, respectively.

Example 35 and 37 and Comparative Example 18

Polymer solutions were obtained in the same manner as the polymer C-2 except that the amounts of tetrahydrofuran, 1,3-butadiene, styrene, pyrrolidine(tetramethyleneimine), n-butyl lithium and modifier were changed as shown in Table 8 and the polymerization temperature was adjusted as shown in Table 9. After 37.5 parts by weight of solution-polymerized SBR rubber (vinyl content=62%, amount of bond ST=25%, weight average molecular weight (Mw)=10,000, ratio (Mw/Mn) of weight average molecular weight (Mw) to number average molecular weight (Mn)=1.05) was added based on 100 parts by weight of a polymer contained in each of the obtained polymer solutions, 2,6-di-t-butyl-p-cresol was added to remove the solvent by steam-stripping, and rubber was dried by a roll of 115° C. The production conditions and physical properties of the polymers are shown in Table 8 and Table 9, respectively.

Examples 36 and 38 and Comparative Example 19

Polymer solutions were obtained in the same manner as the polymer C-2 except that the amounts of tetrahydrofuran, 1,3-butadiene, styrene, pyrrolidine(tetramethyleneimine), n-butyl lithium and modifier were changed as shown in Table 8 and the polymerization temperature was adjusted as shown in Table 9. After 37.5 parts by weight of aromatic oil was added based on 100 parts by weight of a polymer contained in each of the obtained polymer solutions, 2,6-di-t-butyl-p-cresol was added to remove the solvent by steam-stripping, and rubber was dried by a roll of 115° C. The production conditions and physical properties of the polymers are shown in Table 8 and Table 9, respectively.

TABLE 8

| Ex. | polymer No. | amine compound | mmol | other additive | mmol | organic lithium n-BuLi mmol | tetrahydrofuran g | butadiene g | styrene g |
|---|---|---|---|---|---|---|---|---|---|
| 21 | A-2 | butylamine | 4.84 | none | 0.00 | 4.84 | 5.00 | 175 | 175 |
| 22 | B-2 | pyrrolidine | 4.84 | none | 0.00 | 4.84 | 5.00 | 175 | 175 |
| 23 | C-2 | pyrrolidine | 4.84 | none | 0.00 | 4.84 | 5.00 | 175 | 175 |
| 24 | D-2 | pyrrolidine | 4.84 | N,N-diethyl ethanolamine | 2.42 | 7.26 | 5.00 | 175 | 175 |
| 25 | E-2 | pyrrolidine | 4.84 | none | 0.00 | 4.84 | 5.00 | 175 | 175 |
| 26 | F-2 | pyrrolidine | 4.84 | none | 0.00 | 4.84 | 5.00 | 175 | 175 |

TABLE 8-continued

| | | | | | | | | |
|---|---|---|---|---|---|---|---|---|
| 27 | G-2 | pyrrolidine | 4.84 | none | 0.00 | 4.84 | 5.00 | 175 | 175 |
| 28 | H-2 | pyrrolidine | 4.84 | none | 0.00 | 4.84 | 5.00 | 175 | 175 |
| 29 | I-2 | pyrrolidine | 4.84 | none | 0.00 | 4.84 | 5.00 | 175 | 175 |
| 30 | J-2 | pyrrolidine | 4.84 | none | 0.00 | 4.84 | 5.00 | 175 | 175 |
| 31 | K-2 | pyrrolidine | 4.84 | none | 0.00 | 4.84 | 15.00 | 300 | 150 |
| 32 | L-2 | pyrrolidine | 4.84 | none | 0.00 | 4.84 | 1.63 | 100 | 225 |
| 33 | M-2 | N,N-dimethyl-o-toluidine | 4.84 | none | 0.00 | 4.84 | 5.00 | 175 | 175 |
| 34 | N-2 | VBDMA | 4.84 | none | 0.00 | 4.84 | 5.00 | 175 | 175 |
| 35 | O-2 | pyrrolidine | 4.14 | none | 0.00 | 4.14 | 6.25 | 250 | 150 |
| 36 | P-2 | pyrrolidine | 4.14 | none | 0.00 | 4.14 | 6.25 | 250 | 150 |
| 37 | Q-2 | pyrrolidine | 4.14 | none | 0.00 | 4.14 | 20.00 | 250 | 175 |
| 38 | R-2 | pyrrolidine | 4.14 | none | 0.00 | 4.14 | 20.00 | 250 | 175 |

| Ex. | additional butadiene (during polymerization) g | (addition before modification) g | modifier.coupling agent | mmol | remarks |
|---|---|---|---|---|---|
| 21 | 140 | 10 | tin tetrachloride | 0.91 | An initiator is prepared in another pot. |
| 22 | 140 | 10 | tin tetrachloride | 0.91 | An initiator is prepared in another pot. |
| 23 | 140 | 10 | tin tetrachloride | 0.91 | |
| 24 | 140 | 10 | tin tetrachloride | 0.91 | N,N-diethyl ethanolamine is added. |
| 25 | 140 | 10 | N,N,N',N'-tetramethyloxamide | 1.82 | |
| 26 | 140 | 10 | 3,5-diacetylpyridine | 1.82 | |
| 27 | 140 | 10 | methyl triphenoxysilane | 2.42 | |
| 28 | 140 | 10 | diphenylmethane diisocyanate | 4.16 | |
| 29 | 140 | 10 | N,N,N',N'-tetramethyl-3,5-pyridine dicarboxyamide | 1.82 | |
| 30 | 140 | 10 | dioctyltin dichloride | 1.82 | |
| 31 | 50 | 0 | dioctyltin dichloride | 1.82 | |
| 32 | 165 | 10 | dioctyltin dichloride | 1.82 | |
| 33 | 140 | 10 | dioctyltin dichloride | 1.82 | An initiator is prepared in another pot. |
| 34 | 140 | 10 | dioctyltin dichloride | 1.82 | An initiator is prepared in another pot. |
| 35 | 100 | 0 | silicon tetrachloride | 0.78 | extended with liquid rubber. |
| 36 | 100 | 0 | methyl triphenoxysilane | 2.07 | extended with aromatic oil. |
| 37 | 75 | 0 | silicon tetrachloride | 0.78 | extended with liquid rubber. |
| 38 | 75 | 0 | methyl triphenoxysilane | 2.07 | extended with aromatic oil. |

| C.Ex. | polymer No. | amine compound | mmol | other additive | mmol | organic lithium n-BuLi mmol | tetrahydrofuran g | butadiene g | styrene g |
|---|---|---|---|---|---|---|---|---|---|
| 11 | S-2 | none | 0.00 | none | 0.00 | 4.53 | 5.00 | 175 | 175 |
| 12 | T-2 | pyrrolidine | 1.02 | none | 0.00 | 4.68 | 5.00 | 175 | 175 |
| 13 | U-2 | pyrrolidine | 4.84 | none | 0.00 | 4.84 | 12.50 | 365 | 125 |
| 14 | V-2 | pyrrolidine | 4.84 | none | 0.00 | 4.84 | 2.25 | 40 | 275 |
| 15 | W-2 | pyrrolidine | 4.84 | none | 0.00 | 4.84 | 1.50 | 125 | 200 |
| 16 | X-2 | pyrrolidine | 4.84 | none | 0.00 | 4.84 | 30.00 | 340 | 150 |
| 17 | Y-2 | pyrrolidine | 2.57 | none | 0.00 | 3.43 | 5.00 | 175 | 175 |
| 18 | Z-2 | none | 0.00 | none | 0.00 | 4.06 | 20.00 | 250 | 175 |
| 19 | AA-2 | none | 0.00 | none | 0.00 | 4.06 | 20.00 | 250 | 175 |

| C.Ex. | additional butadiene (during polymerization) g | (addition before modification) g | modifier.coupling agent | mmol | remarks |
|---|---|---|---|---|---|
| 11 | 140 | 10 | dioctyltin dichloride | 1.82 | An n-butyl lithium initiator is used. |
| 12 | 140 | 10 | dioctyltin dichloride | 1.82 | Both N-butyl lithium initiator and pyrrolidine lithium initiator are used. |
| 13 | 0 | 10 | dioctyltin dichloride | 1.82 | |
| 14 | 175 | 10 | dioctyltin dichloride | 1.82 | |
| 15 | 165 | 10 | dioctyltin dichloride | 1.82 | |
| 16 | 0 | 10 | dioctyltin dichloride | 1.82 | |
| 17 | 140 | 10 | N,N,N',N'-tetraethyl diaminobenzophenone | 2.57 | |
| 18 | 75 | 0 | silicon tetrachloride | 0.76 | extended with an n-butyl lithium initiator and liquid rubber. |
| 19 | 75 | 0 | methyl triphenoxysilane | 2.03 | extended with an n-butyl |

TABLE 8-continued

|  |  |
|---|---|
|  | lithium initiator and aromatic oil. |

Ex.: Example
C.Ex.: Comparative Example

TABLE 9

| Ex. | polymer No. | polymerization start temperature (° C.) | polymerization maximum temperature (° C.) | content of amino groups (N) (mmol/g.polymer) | content of vinyl (%) | content of styrene (%) | glass transition temperature (° C.) |
|---|---|---|---|---|---|---|---|
| 21 | A-2 | 55 | 85 | 0.0095 | 31 | 35 | −40 |
| 22 | B-2 | 55 | 86 | 0.0095 | 31 | 35 | −41 |
| 23 | C-2 | 55 | 88 | 0.0095 | 31 | 35 | −41 |
| 24 | D-2 | 55 | 87 | 0.0096 | 31 | 35 | −40 |
| 25 | E-2 | 55 | 86 | 0.0094 | 31 | 35 | −41 |
| 26 | F-2 | 55 | 85 | 0.0096 | 31 | 35 | −40 |
| 27 | G-2 | 55 | 85 | 0.0095 | 31 | 35 | −40 |
| 28 | H-2 | 55 | 87 | 0.0094 | 32 | 35 | −39 |
| 29 | I-2 | 55 | 87 | 0.0095 | 31 | 35 | −41 |
| 30 | J-2 | 55 | 87 | 0.0095 | 31 | 35 | −41 |
| 31 | K-2 | 20 | 86 | 0.0095 | 50 | 30 | −34 |
| 32 | L-2 | 50 | 88 | 0.0094 | 25 | 45 | −33 |
| 33 | M-2 | 55 | 87 | 0.0095 | 31 | 35 | −40 |
| 34 | N-2 | 55 | 88 | 0.0095 | 30 | 35 | −40 |
| 35 | O-2 | 45 | 88 | 0.0079 | 35 | 30 | −45 |
| 36 | P-2 | 45 | 89 | 0.0082 | 35 | 30 | −46 |
| 37 | Q-2 | 45 | 88 | 0.0079 | 45 | 35 | −31 |
| 38 | R-2 | 45 | 86 | 0.0081 | 45 | 35 | −31 |

| Ex. | GPC pattern | modifier | coupling efficiency (%) | extender oil (parts by weight) | liquid rubber (parts by weight) | mooney viscosity |
|---|---|---|---|---|---|---|
| 21 | bimodal | tin tetrachloride | 66 | 0 | 0 | 72 |
| 22 | bimodal | tin tetrachloride | 67 | 0 | 0 | 73 |
| 23 | bimodal | tin tetrachloride | 68 | 0 | 0 | 74 |
| 24 | bimodal | tin tetrachloride | 75 | 0 | 0 | 76 |
| 25 | bimodal | N,N,N',N'-tetramethyloxamide | 63 | 0 | 0 | 64 |
| 26 | bimodal | 3,5-diacetylpyridine | 61 | 0 | 0 | 65 |
| 27 | bimodal | methyl triphenoxysilane | 45 | 0 | 0 | 60 |
| 28 | bimodal | diphenylmethane diisocyanate | 66 | 0 | 0 | 70 |
| 29 | bimodal | N,N,N',N'-tetramethyl-3,5-pyridine dicarboxyamide | 70 | 0 | 0 | 68 |
| 30 | bimodal | dioctyltin dichloride | 68 | 0 | 0 | 67 |
| 31 | bimodal | dioctyltin dichloride | 66 | 0 | 0 | 66 |
| 32 | bimodal | dioctyltin dichloride | 69 | 0 | 0 | 68 |
| 33 | biinodal | dioctyltin dichloride | 62 | 0 | 0 | 72 |
| 34 | bimodal | dioctyltin dichloride | 65 | 0 | 0 | 73 |
| 35 | bimodal | silicon tetrachloride | 68 | 0 | 37.5 | 38* |
| 36 | bimodal | methyl triphenoxysilane | 47 | 37.5 | 0 | 41* |
| 37 | bimodal | silicon tetrachloride | 69 | 0 | 37.5 | 39* |
| 38 | bimodal | methyl triphenoxysilane | 48 | 37.5 | 0 | 42* |

| C.Ex. | polymer No. | polymerization start temperature (° C.) | polymerization maximum temperature (° C.) | content of amino groups (N) (mmol/g.polymer) | content of vinyl (%) | content of styrene (%) | glass transition temperature (° C.) |
|---|---|---|---|---|---|---|---|
| 11 | S-2 | 55 | 88 | 0.0000 | 31 | 35 | −40 |
| 12 | T-2 | 55 | 86 | 0.0020 | 31 | 35 | −40 |
| 13 | U-2 | 20 | 85 | 0.0095 | 53 | 25 | −41 |
| 14 | V-2 | 55 | 90 | 0.0095 | 25 | 55 | −30 |
| 15 | W-2 | 55 | 89 | 0.0094 | 21 | 40 | −40 |
| 16 | X-2 | 20 | 83 | 0.0096 | 60 | 30 | −26 |
| 17 | Y-2 | 55 | 89 | 0.0050 | 31 | 35 | −41 |
| 18 | Z-2 | 45 | 97 | 0.0000 | 45 | 35 | −31 |
| 19 | AA-2 | 45 | 88 | 0.0000 | 45 | 35 | −30 |

| C.Ex. | GPC pattern | modifier | coupling efficiency (%) | extender oil (parts by weight) | liquid rubber (parts by weight) | mooney viscosity |
|---|---|---|---|---|---|---|
| 11 | bimodal | dioctyltin dichloride | 71 | 0 | 0 | 68 |
| 12 | bimodal | dioctyltin dichlloride | 68 | 0 | 0 | 66 |

TABLE 9-continued

| | | | | | | |
|---|---|---|---|---|---|---|
| 13 | bimodal | dioctyltin dichloride | 66 | 0 | 0 | 65 |
| 14 | bimodal | dioctyltin dichloride | 69 | 0 | 0 | 67 |
| 15 | bimodal | dioctyltin dichloride | 66 | 0 | 0 | 65 |
| 16 | bimodal | dioctyltin dichloride | 68 | 0 | 0 | 67 |
| 17 | mono-modal | N,N,N',N'-tetraethyl aminobenzophenone | — | 0 | 0 | 60 |
| 18 | bimodal | silicon tetrachloride | 66 | 0 | 37.5 | 39* |
| 19 | bimodal | methyl triphenoxysilane | 45 | 37.5 | 0 | 41* |

Ex.: Example
C.Ex.: Comparative Example
Notes
Mooney viscosity is measured at ML1 + 4, 100° C.
*indicates Mooney viscosity after oil extension.

EVALUATION OF PHYSICAL PROPERTIES OF RUBBER COMPOSITION

Reference Examples 31 to 43 and Comparative Reference Examples 21 to 27 (carbon black-containing polymers for low fuel consumption tires)

Styrene-butadiene copolymer rubber containing no extender oil and no liquid rubber was vulcanized under conditions shown in A of Table 1, and the physical properties of the vulcanized copolymer rubber were evaluated. Tensile strength, tanδ (0° C.), tanδ (50° C.) and Lambourn abrasion are expressed as indices when the values of Comparative Reference Example 21 (polymer S-2) are taken as 100. The larger the values the better these physical properties are.

The polymers used for evaluation and the evaluation results of their physical properties are shown in Table 10.

TABLE 10

| composition A | polymer | | | | | |
|---|---|---|---|---|---|---|
| | No. | initiator | modifier | vinyl (%) | ST (%) | coupling efficiency (%) |
| Ref.Ex.31 | A-2 | di-n-butyl lithium amide | tin tetrachloride | 31 | 35 | 66 |
| Ref.Ex.32 | B-2 | pyrrolidine lithium | tin tetrachloride | 31 | 35 | 67 |
| Ref.Ex.33 | C-2 | pyrrolidine lithium | tin tetrachloride | 31 | 35 | 68 |
| Ref.Ex.34 | D-2 | pyrrolidine lithium | tin tetrachloride | 31 | 35 | 75 |
| Ref.Ex.35 | E-2 | pyrrolidine lithium | N,N,N',N'-tetramethyl oxamide | 31 | 35 | 63 |
| Ref.Ex.36 | F-2 | pyrrolidine lithium | 3,5-diacetylpyridine | 31 | 35 | 61 |
| Ref.Ex.37 | H-2 | pyrrolidine lithium | diphenylmethane diisocyanate | 32 | 35 | 66 |
| Ref.Ex.38 | I-2 | pyrrolidine lithium | N,N,N',N'-tetramethyl-3,5-pyridine dicarboxyamide | 31 | 35 | 70 |
| Ref.Ex.39 | J-2 | pyrrolidine lithium | dioctyltin dichloride | 31 | 35 | 68 |
| Ref.Ex.40 | K-2 | pyrrolidine lithium | dioctyltin dichloride | 50 | 30 | 66 |
| Ref.Ex.41 | L-2 | pyrrolidine lithium | dioctyltin dichloride | 25 | 45 | 69 |
| Ref.Ex.42 | M-2 | N,N-dimethyl-o-toluidine lithium | dioctyltin dichloride | 31 | 35 | 62 |
| Ref.Ex.43 | N-2 | VBDMA-Li | dioctyltin dichloride | 30 | 35 | 65 |

| composition A | polymer | | | | | | |
|---|---|---|---|---|---|---|---|
| | glass transition temperature (° C.) | others | extrusion processability | tensile strength (index) | tan δ at 0° C. (index) | tan δ at 50° C. (index) | Lambourn abrasion (index) |
| Ref.Ex.31 | −40 | | ⊚ | 107 | 101 | 109 | 109 |
| Ref.Ex.32 | −41 | | ⊚ | 109 | 101 | 111 | 111 |
| Ref.Ex.33 | −41 | | ⊚ | 109 | 102 | 112 | 111 |
| Ref.Ex.34 | −40 | | ⊚ | 110 | 101 | 112 | 112 |
| Ref.Ex.35 | −41 | | ○ | 105 | 100 | 107 | 106 |
| Ref.Ex.36 | −40 | | ○ | 105 | 101 | 106 | 106 |
| Ref.Ex.37 | −39 | | ○ | 108 | 100 | 110 | 110 |
| Ref.Ex.38 | −41 | | ○ | 104 | 100 | 107 | 107 |
| Ref.Ex.39 | −41 | | ⊚ | 110 | 101 | 119 | 117 |
| Ref.Ex.40 | −34 | | ⊚ | 98 | 110 | 110 | 102 |
| Ref.Ex.41 | −33 | | ⊚ | 115 | 113 | 108 | 110 |
| Ref.Ex.42 | −40 | | ⊚ | 108 | 101 | 116 | 114 |
| Ref.Ex.43 | −40 | | ⊚ | 107 | 100 | 114 | 114 |

TABLE 10-continued

| composition A | No. | initiator | modifier | vinyl (%) | ST (%) | coupling efficiency (%) |
|---|---|---|---|---|---|---|
| C.Ref.Ex.21 | S-2 | n-Buli | dioctyltin dichloride | 31 | 35 | 71 |
| C.Ref.Ex.22 | T-2 | pyrrolidine lithium/n-Buli | dioctyltin dichloride | 31 | 35 | 68 |
| C.Ref.Ex.23 | U-2 | pyrrolidine lithium | dioctyltin dichloride | 53 | 25 | 66 |
| C.Ref.Ex.24 | V-2 | pyrrolidine lithium | dioctyltin dichloride | 25 | 55 | 69 |
| C.Ref.Ex.25 | W-2 | pyrrolidine lithium | dioctyltin dichloride | 21 | 40 | 66 |
| C.Ref.Ex.26 | X-2 | pyrrolidine lithiun | dioctyltin dichloride | 60 | 30 | 68 |
| C.Ref.Ex.27 | Y-2 | pyrrolidine lithium | N,N,N',N'-tetraethyl aminobenzophenone | 31 | 35 | — |

| composition A | glass transition temperature (° C.) | others | extrusion processability | tensile strength (index) | tan δ at 0° C. (index) | tan δ at 50° C. (index) | Lambourn abrasion (index) |
|---|---|---|---|---|---|---|---|
| C.Ref.Ex.21 | −40 | | ⊚ | 100 | 100 | 100 | 100 |
| C.Ref.Ex.22 | −40 | | ⊚ | 102 | 99 | 103 | 102 |
| C.Ref.Ex.23 | −41 | | ⊚ | 100 | 98 | 120 | 94 |
| C.Ref.Ex.24 | −30 | | ⊚ | 110 | 110 | 90 | 108 |
| C.Ref.Ex.25 | −40 | | ⊚ | 103 | 102 | 95 | 102 |
| C.Ref.Ex.26 | −26 | | ⊚ | 95 | 111 | 87 | 92 |
| C.Ref.Ex.27 | −41 | | x | 96 | 101 | 95 | 94 |

Ref.Ex.: Reference Example
C.Ref.Ex.: Comparative Reference Example

Reference Examples 44 to 48 and Comparative Reference Examples 28 to 30 (carbon black-containing polymers for high-performance tires)

Copolymer rubber was vulcanized under conditions shown in B of Table 1 and the physical properties of the vulcanized copolymer rubber were evaluated. Tensile strength, tanδ (0° C.), tanδ (50° C.) and Lambourn abrasion are expressed as indices when the values of Comparative Reference Example 28 (polymer S-2) are taken as 100. The larger the values the better these physical properties are.

The polymers used for evaluation and the evaluation results of their physical properties are shown in Table 11.

TABLE 11

| composition B | No. | initiator | modifier | vinyl (%) | ST (%) | coupling efficiency (%) |
|---|---|---|---|---|---|---|
| Ref.Ex.44 | A-2 | di-n-butyl lithium amide | tin tetrachloride | 31 | 35 | 66 |
| Ref.Ex.45 | C-2 | pyrrolidine lithium | tin tetrachloride | 31 | 35 | 68 |
| Ref.Ex.46 | H-2 | pyrrolidine lithium | diphenylmethane diisocyanate | 32 | 35 | 66 |
| Ref.Ex.47 | J-2 | pyrrolidine lithium | dioctyltin dichloride | 31 | 35 | 68 |
| Ref.Ex.48 | O-2 | pyrrolidine lithium | silicon tetrachloride | 45 | 35 | 68 |
| C.Ref.Ex.28 | S-2 | n-BuLi | dioctyltin dichloride | 31 | 35 | 71 |
| C.Ref.Ex.29 | T-2 | n-BuLi/pyrrolidine lithium | dioctyltin dichloride | 31 | 35 | 68 |
| C.Ref.Ex.30 | Z-2 | n-BuLi | silicon tetrachloride | 45 | 35 | 66 |

| composition A | glass transition temperature (° C.) | remarks | processability | tensile strength (index) | tan δ at 0° C. (index) | tan δ at 50° C. (index) | Lambourn abrasion (index) |
|---|---|---|---|---|---|---|---|
| Ref.Ex.44 | −40 | | ⊚ | 104 | 101 | 112 | 100 |
| Ref.Ex.45 | −41 | | ⊚ | 105 | 101 | 114 | 109 |
| Ref.Ex.46 | −39 | | ○ | 106 | 102 | 110 | 108 |
| Ref.Ex.47 | −41 | | ○ | 107 | 103 | 121 | 113 |
| Ref.Ex.48 | −45 | extended with liquid rubber | ⊚ | 105 | 105 | 104 | 114 |
| C.Ref.Ex.28 | −40 | | ○ | 100 | 100 | 100 | 100 |
| C.Ref.Ex.29 | −40 | | ○ | 101 | 100 | 103 | 102 |
| C.Ref.Ex.30 | −31 | extended with liquid | ⊚ | 103 | 107 | 85 | 110 |

TABLE 11-continued rubber

Ref.Ex.: Reference Example
C.Ref.Ex.: Comparative Reference Example

Reference Examples 49 to 54 and Comparative Reference Examples 31 to 34 (silica-containing polymers for low fuel consumption tires)

Styrene-butadiene copolymer rubber was vulcanized under conditions shown in C of Table 1 and the physical properties of the vulcanized copolymer rubber were evaluated. Tensile strength, tan δ (0° C.), tan δ (50° C.) and Lambourn abrasion are expressed as indices when the values of Comparative Reference Example 31 (polymer S-2) are taken as 100. The larger the values the better these physical properties are.

The polymers used for evaluation and the evaluation results of their physical properties are shown in Table 12.

Reference Examples 55 to 60 and Comparative Reference Examples 35 to 38 (carbon-black-and-silica-based polymers for low fuel consumption tires)

Styrene-butadiene copolymer rubber was vulcanized under conditions shown in D of Table 1 and the physical properties of the vulcanized copolymer rubber were evaluated. Tensile strength, tan δ (0° C.), tan δ (50° C.) and Lambourn abrasion are expressed as indices when the values of Comparative Reference Example 35 (polymer S-2) are taken as 100. The larger the values the better these physical properties are.

The polymers used for evaluation and the evaluation results of their physical properties are shown in Table 13.

TABLE 12

| composition C | No. | initiator | modifier | vinyl (%) | ST (%) | coupling efficiency (%) |
|---|---|---|---|---|---|---|
| Ref.Ex.49 | G-2 | pyrrolidine lithium | methyl triphenoxysilane | 31 | 35 | 45 |
| Ref.Ex.50 | J-2 | pyrrolidine lithium | dioctyltin dichloride | 31 | 35 | 68 |
| Ref.Ex.51 | O-2 | pyrrolidine lithium | silicon tetrachloride | 35 | 30 | 68 |
| Ref.Ex.52 | P-2 | pyrrolidine lithium | methyl triphenoxysilane | 35 | 30 | 47 |
| Ref.Ex.53 | Q-2 | pyrrolidine lithium | silicon tetrachloride | 45 | 35 | 69 |
| Ref.Ex.54 | R-2 | pyrrolidine lithium | methyl triphenoxysilane | 45 | 35 | 48 |
| C.Ref.Ex.31 | S-2 | n-BuLi | dioctyltin dichloride | 31 | 35 | 71 |
| C.Ref.Ex.32 | Y-2 | pyrrolidine lithium | N,N,N',N'-tetraethyl aminobenzophenone | 31 | 35 | — |
| C.Ref.Ex.33 | Z-2 | n-BuLi | silicon tetrachloride | 45 | 35 | 66 |
| C.Ref.Ex.34 | AA-2 | n-BuLi | methyl triphenoxysilane | 45 | 35 | 45 |

| composition C | glass transition temperature (° C.) | remarks | processability | tensile strength (index) | tan δ at 0° C. (index) | tan δ at 50° C. (index) | Lambourn abrasion (index) |
|---|---|---|---|---|---|---|---|
| Ref.Ex.49 | −40 | | ○ | 110 | 100 | 115 | 110 |
| Ref.Ex.50 | −41 | | ◎ | 105 | 100 | 110 | 105 |
| Ref.Ex.51 | −45 | extended with liquid rubber | ◎ | 103 | 103 | 106 | 113 |
| Ref.Ex.52 | −46 | extended with aromatic oil | ◎ | 105 | 99 | 108 | 115 |
| Ref.Ex.53 | −31 | extended with liquid rubber | ◎ | 105 | 125 | 98 | 110 |
| Ref.Ex.54 | −31 | extended with aromatic oil | ◎ | 107 | 118 | 100 | 112 |
| C.Ref.Ex.31 | −40 | | ◎ | 100 | 100 | 100 | 100 |
| C.Ref.Ex.32 | −41 | | x | 91 | 99 | 91 | 93 |
| C.Ref.Ex.33 | −31 | extended with liquid rubber | ◎ | 98 | 112 | 89 | 107 |
| C.Ref.Ex.34 | −30 | extended with aromatic oil | ◎ | 100 | 110 | 92 | 102 |

Ref.Ex.: Reference Example
C.Ref.Ex.: Comparative Reference Example

TABLE 13

| composition D | No. | initiator | modifier | vinyl (%) | ST (%) | coupling efficiency (%) |
|---|---|---|---|---|---|---|
| Ref.Ex.55 | G-2 | pyrrolidine lithium | methyl triphenoxysilane | 31 | 35 | 45 |
| Ref.Ex.56 | J-2 | pyrrolidine lithium | dioctyltin dichloride | 31 | 35 | 68 |
| Ref.Ex.57 | O-2 | pyrrolidine lithium | silicon tetrachloride | 35 | 30 | 68 |
| Ref.Ex.58 | P-2 | pyrrolidine lithium | methyl triphenoxysilane | 35 | 30 | 47 |
| Ref.Ex.59 | Q-2 | pyrrolidine lithium | silicon tetrachloride | 45 | 35 | 69 |
| Ref.Ex.60 | R-2 | pyrrolidine lithium | methyl triphenoxysilane | 45 | 35 | 48 |
| C.Ref.Ex.35 | S-2 | n-BuLi | dioctyltin dichloride | 31 | 35 | 71 |
| C.Ref.Ex.36 | Y-2 | pyrrolidine lithium | N,N,N',N'-tetraethyl diaminobenzophenone | 31 | 35 | — |
| C.Ref.Ex.37 | Z-2 | n-BuLi | silicon tetrachloride | 45 | 35 | 66 |
| C.Ref.Ex.38 | AA-2 | n-BuLi | methyl triphenoxysilane | 45 | 35 | 45 |

| composition C | glass transition temperature (° C.) | remarks | processability | tensile strength (index) | tan δ at 0° C. (index) | tan δ at 50° C. (index) | Lambourn abrasion (index) |
|---|---|---|---|---|---|---|---|
| Ref.Ex.55 | −40 | | ○ | 107 | 99 | 112 | 108 |
| Ref.Ex.56 | −41 | | ⊚ | 106 | 102 | 115 | 109 |
| Ref.Ex.57 | −45 | extended with liquid rubber | ⊚ | 104 | 104 | 105 | 114 |
| Ref.Ex.58 | −46 | extended with aromatic oil | ⊚ | 103 | 100 | 105 | 112 |
| Ref.Ex.59 | −31 | extended with liquid rubber | ⊚ | 103 | 125 | 98 | 109 |
| Ref.Ex.60 | −31 | extended with aromtic oil | ⊚ | 105 | 114 | 99 | 107 |
| C.Ref.Ex.35 | −40 | | ⊚ | 100 | 100 | 100 | 100 |
| C.Ref.Ex.36 | −41 | | x | 93 | 99 | 92 | 94 |
| C.Ref.Ex.37 | −31 | extended with liquid rubber | ⊚ | 100 | 109 | 88 | 107 |
| C.Ref.Ex.38 | −30 | extended with aromatic oil | ⊚ | 101 | 107 | 89 | 104 |

Ref.Ex.: Reference Example
C.Ref.Ex.: Comparative Reference Example

The following points are understood from Tables 8 to 13.

It is understood from the evaluation results of carbon black-containing polymers for low fuel consumption tires shown in Table 10 that the diolefin-based copolymer rubber of the present invention having an amino group introduced to the polymerization terminal retains the wet-skid resistance (tanδ, 0° C.) of the conventional polymer obtained from an organic lithium compound and has improved balance among tensile strength, abrasion resistance and hysteresis-loss characteristics (tanδ, 50° C.).

It is also understood that the physical properties of the polymer which is polymerized with an amine-containing initiator are greatly improved by modifying the active terminal of the polymer with a tin compound, amide compound, pyridine-substituted ketone compound or isocyanate compound to introduce a functional group to both terminals of a molecular chain efficiently.

The polymer of Comparative Reference Example 27 is a polymer having an amino group introduced to the polymerization terminal and having a monomodal molecular weight distribution. It is seen that the polymer has poor extrusion processability and is inferior in tensile strength, abrasion resistance and hysteresis-loss characteristics (tanδ, 50° C.).

It is also understood from the evaluation of carbon black-filled compounds for high-performance tires shown in Table 11, the evaluation of silica-filled compounds for low fuel consumption tires shown in Table 12 and the evaluation of silica-and-carbon-black-filled compounds for low fuel consumption tires shown in Table 13 that the polymers of the present invention have improved physical properties as compared with the conventional polymers obtained from organic lithium.

According to the present invention, there is provided diolefin-based copolymer rubber having a specific content of polymerization units of an aromatic vinyl compound and a specific content of vinyl bonds in the polymerization unit of a conjugated diolefin and a specific GPC molecular weight distribution and having an amino group introduced to the terminal. This diolefin-based copolymer rubber has high processability when containing carbon black or silica and improved balance among wet-skid resistance, abrasion resistance and failure characteristics and can be advantageously used as tread rubber for high-performance tires, low fuel consumption tires, all-season tires and the like.

What is claimed is:

1. Copolymer rubber of a conjugated diolefin and an aromatic vinyl compound, wherein
   (1) the content of amino groups bound to the rubber (nitrogen content value) is 0.0025 to 0.20 mmol/g of copolymer rubber,
   (2) the content of the polymerization units of the aromatic vinyl compound is 5 wt % or more and less than 30 wt % based on the copolymer rubber,
   (3) the content of vinyl bonds in the polymerization unit of the conjugated diolefin (the total content of a 1,2- bond and a 3,4-bond) is 55 mol % or more based on the polymerization unit of the conjugated diolefin, and (4) the molecular weight distribution is polymodal.

2. Copolymer rubber of a conjugated diolefin and an aromatic vinyl compound, wherein (1) the content of amino groups bound to rubber (nitrogen content value) is 0.0025 to 0.20 mmol/g of copolymer rubber, (2) the content of the polymerization units of the aromatic vinyl compound is 30 to 50 wt % based on the copolymer rubber, (3) the content of vinyl bonds in the polymerization unit of the conjugated diolefin (the total content of a 1,2-bond and a 3,4-bond) is 25 to 55 mol % based on the polymerization unit of the conjugated diolefin, and (4) the molecular weight distribution is polymodal.

3. The copolymer rubber of claim 1 or 2, wherein at least 40% of the polymerization end terminals of the copolymer rubber is modified or coupled with at least one compound selected from the group consisting of:

(a) an isocyanate compound and/or an isothiocyanate compound, (b) an amide compound and/or an imide compound, (c) a pyridyl-substituted ketone compound and/or a pyridyl-substituted vinyl compound, (d) a silicon compound, (e) an ester compound, (f) a ketone compound, and (g) a tin compound.

4. The copolymer rubber of claim 1 or 2, wherein at least 40% of the polymerization end terminals of the copolymer rubber is modified or coupled with at least one compound selected from the group consisting of the above compounds (a), (b), (f) and (g).

5. The copolymer rubber of claim 1 or 2, wherein the amino group is represented by the following formula (a1) and/or the following formula (a2):

(a1)

wherein $R^1$ is hydrogen (—H), alkyl group having 1 to 20 carbon atoms or aryl group having 6 to 20 carbon atoms, and $R^2$ is an alkyl group having 1 to 20 carbon atoms or aryl group having 6 to 20 carbon atoms,

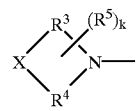

(a2)

wherein $R^3$ and $R^4$ are the same or different and each an alkylene group having 1 to 3 carbon atoms, X is a group selected from —$CH_2$—, —O— and —NH—, $R^5$ is hydrogen (—H) or alkyl group having 1 to 5 carbon atoms, and k is an integer of 1 to 4.

6. A rubber composition containing 100 parts by weight of all rubber components including the copolymer rubber of any of claims 1 to 5 and 20 to 120 parts by weight of at least one filler selected from the group consisting of carbon black, silica and a carbon black/silica dual phase filler.

7. The rubber composition of claim 6 for a tire tread.

8. A tire whose tread is made from the rubber composition of claim 6.

* * * * *